United States Patent
Sasaki et al.

(10) Patent No.: US 11,546,490 B2
(45) Date of Patent: Jan. 3, 2023

(54) IMAGE GENERATION METHOD, IMAGING APPARATUS, AND RECORDING MEDIUM

(71) Applicant: PANASONIC INTELLECTUAL PROPERTY MANAGEMENT CO., LTD., Osaka (JP)

(72) Inventors: Shougo Sasaki, Osaka (JP); Tadayuki Inoue, Hyogo (JP); Shuji Yano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/420,021

(22) PCT Filed: Dec. 4, 2019

(86) PCT No.: PCT/JP2019/047315
§ 371 (c)(1),
(2) Date: Jun. 30, 2021

(87) PCT Pub. No.: WO2020/246060
PCT Pub. Date: Dec. 10, 2020

(65) Prior Publication Data
US 2022/0094819 A1 Mar. 24, 2022

(30) Foreign Application Priority Data
Jun. 7, 2019 (JP) .............................. JP2019-107183

(51) Int. Cl.
*H04N 9/64* (2006.01)
*H04N 5/217* (2011.01)
(Continued)

(52) U.S. Cl.
CPC ....... *H04N 5/2173* (2013.01); *H04N 5/23229* (2013.01); *H04N 17/002* (2013.01)

(58) Field of Classification Search
CPC ............ H04N 5/2173; H04N 5/23229; H04N 17/002; H04N 9/64
(Continued)

(56) References Cited

U.S. PATENT DOCUMENTS 7,999,217 B2 * 8/2011 Katsuda ........... H04N 5/232122
250/237 R
2009/0153705 A1 * 6/2009 Katsuda ........... H04N 5/232122
348/E5.091
(Continued)

FOREIGN PATENT DOCUMENTS

JP 2000-125204 A 4/2000
JP 2003-169258 A 6/2003

OTHER PUBLICATIONS

International Search Report and Written Opinion dated Mar. 3, 2020 in International Patent Application No. PCT/JP2019/047315; with partial English translation.
(Continued)

*Primary Examiner* — Trang U Tran
(74) *Attorney, Agent, or Firm* — McDermott Will & Emery LLP

(57) ABSTRACT

An image generation method in an imaging apparatus that includes a plurality of pixels, includes: performing a first imaging operation of capturing an image when each of the plurality of pixels is shielded from light, in a state in which a reference signal level in the first imaging operation is set to a first offset value; and generating first image data based on a first pixel signal obtained by the first imaging operation. The first offset value is higher than a second offset value that is a reference signal level in a second imaging operation of capturing an image in a state in which light is incident on each of the plurality of pixels.

11 Claims, 15 Drawing Sheets

(51) Int. Cl.
*H04N 5/232* (2006.01)
*H04N 17/00* (2006.01)

(58) Field of Classification Search
USPC .................................................. 348/187, 241
See application file for complete search history.

(56) References Cited

U.S. PATENT DOCUMENTS

2010/0053383 A1   3/2010  Ichikawa
2016/0219229 A1*  7/2016  Kimura .................. H04N 5/357
2017/0230569 A1*  8/2017  Sambonsugi .......... H04N 5/378
2020/0314372 A1* 10/2020  Miyatani ........... H01L 27/14625

OTHER PUBLICATIONS

Extended European Search Report dated Jun. 28, 2022 issued in the corresponding European Patent Application No. 19931530.0.

\* cited by examiner

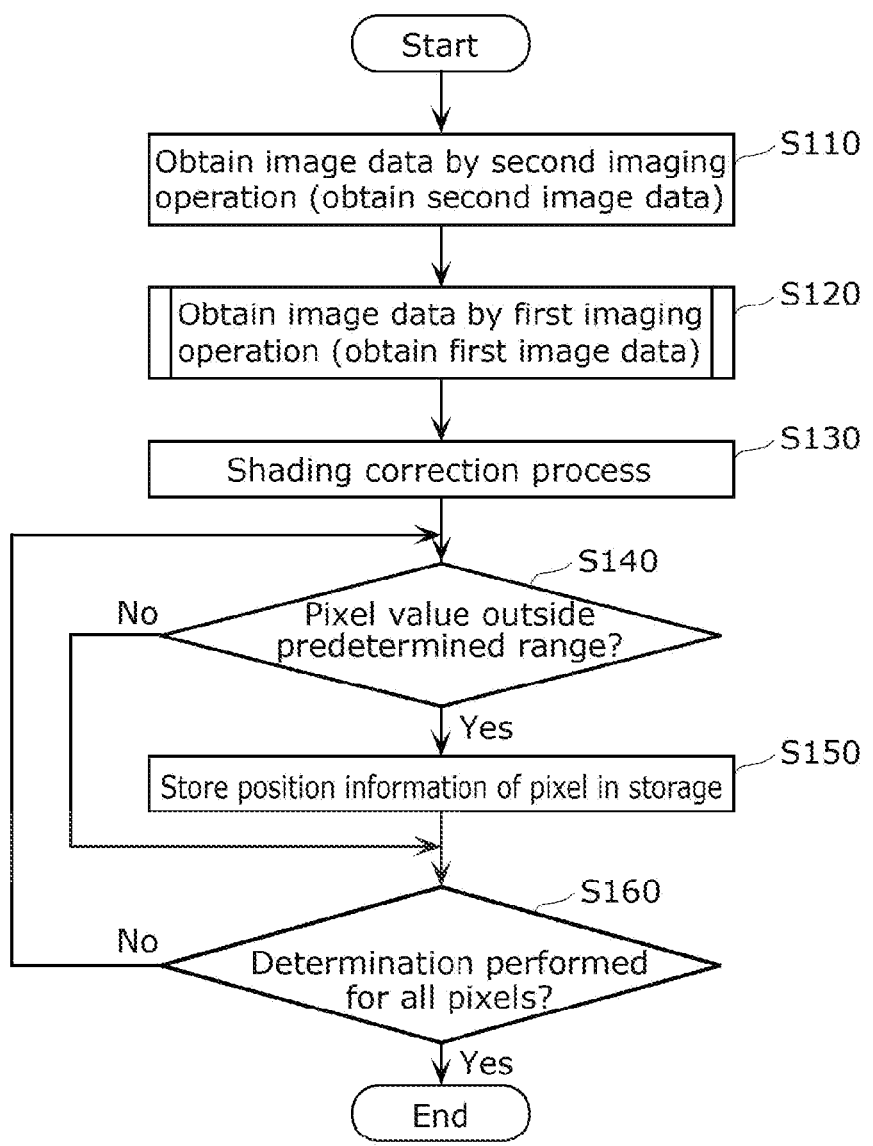

11,546,490 B2

IMAGE GENERATION METHOD, IMAGING APPARATUS, AND RECORDING MEDIUM

CROSS-REFERENCE OF RELATED APPLICATIONS

This application is the U.S. National Phase under 35 U.S.C. § 371 of International Patent Application No. PCT/JP2019/047315, filed on Dec. 4, 2019, which in turn claims the benefit of Japanese Application No. 2019-107183, filed on Jun. 7, 2019, the entire disclosures of which Applications are incorporated by reference herein.

TECHNICAL FIELD

The present disclosure relates to an image generation method, an imaging apparatus, and a recording medium.

BACKGROUND ART

Imaging apparatuses that capture images using image sensors are conventionally known. An image obtained by such an imaging apparatus may contain noise depending on the physical characteristics of the image sensor. In view of this, there is conventionally disclosed an electronic camera that, after performing an imaging operation, operates a shutter and performs a dummy imaging operation in a state in which the light receiving surface of an image sensor is shielded from light, and corrects captured image data using dummy imaging data obtained by the dummy imaging operation (see Patent Literature (PTL) 1).

CITATION LIST

Patent Literature

[PTL 1]
Japanese Unexamined Patent Application Publication No. 2000-125204

SUMMARY OF INVENTION

Technical Problem

With the method in PTL 1, however, noise cannot be appropriately obtained depending on the noise type.
The present disclosure accordingly relates to an image generation method, an imaging apparatus, and a recording medium that can obtain noise more appropriately than conventional techniques.

Solution to Problem

To achieve the object stated above, an image generation method according to an aspect of the present disclosure is an image generation method in an imaging apparatus that includes a plurality of pixels, the image generation method including: performing a first imaging operation of capturing an image when each of the plurality of pixels is shielded from light, in a state in which a reference signal level in the first imaging operation is set to a first offset value; and generating first image data based on a first pixel signal obtained by the first imaging operation, wherein the first offset value is higher than a second offset value that is a reference signal level in a second imaging operation of capturing an image in a state in which light is incident on each of the plurality of pixels.

To achieve the object stated above, an imaging apparatus according to an aspect of the present disclosure includes: a plurality of pixels; a controller that performs control to perform a first imaging operation of capturing an image when each of the plurality of pixels is shielded from light, in a state in which a reference signal level in the first imaging operation is set to a first offset value; and a generator that generates image data based on a pixel signal obtained by the first imaging operation, wherein the controller controls the first offset value to be higher than a second offset value that is a reference signal level in a second imaging operation of capturing an image in a state in which light is incident on each of the plurality of pixels.

To achieve the object stated above, a recording medium according to an aspect of the present disclosure is a non-transitory computer-readable recording medium having a program recorded thereon for causing a computer to execute the above-described image generation method.

These general and specific aspects may be implemented using a system, a method, an integrated circuit, a computer program, or a computer-readable non-transitory recording medium such as CD-ROM, or any combination of a system, a method, an integrated circuit, a computer program, and a recording medium. The program may be stored in the recording medium beforehand, or supplied to the recording medium via a wide area communication network such as the Internet.

Advantageous Effects of Invention

With the image generation method, etc. according to an aspect of the present disclosure, noise can be obtained more appropriately than conventional techniques.

BRIEF DESCRIPTION OF DRAWINGS

FIG. 9 is a flowchart illustrating operation when obtaining position information of a defective pixel in the imaging apparatus according to the embodiment.

DESCRIPTION OF EMBODIMENTS (Underlying Knowledge Forming Basis of the Present Disclosure)

Figure 14:
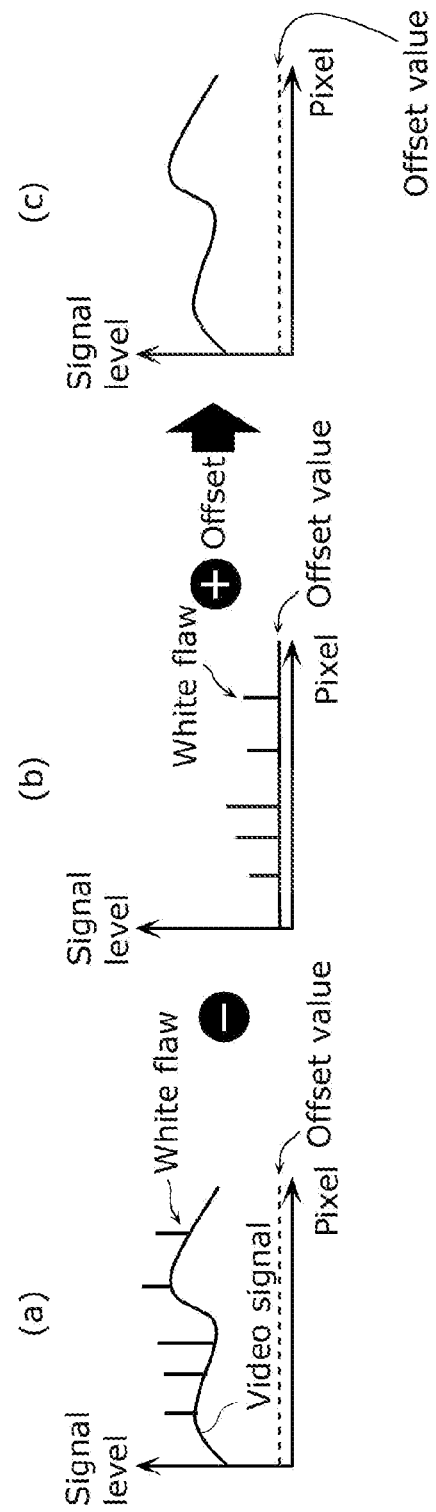
FIG. 14 is a first schematic diagram explaining operation when performing correction in an imaging apparatus according to a comparative example.

Operation when performing correction in an imaging apparatus according to a comparative example will be described below, with reference to FIGS. 14 and 15. FIG. 14 is a first schematic diagram explaining operation when performing correction in the imaging apparatus according to the comparative example. FIG. 14 illustrates the case where, from among white flaws and black flaws, only white flaws occur in imaging by long exposure.

In the specification, a white flaw is noise in which a signal level higher than an actual level is detected due to a pixel defect and that grows (increases) with exposure time. In other words, a white flaw is noise of a positive value in which a signal level higher than an actual level is detected when the exposure time is longer. A black flaw is noise in which a signal level lower than an actual level is detected due to a pixel defect and that grows (increases) with exposure time. In other words, a black flaw is noise of a negative value in which a signal level lower than an actual level is detected when the exposure time is longer.

The imaging apparatus according to the comparative example is capable of executing a first imaging operation of performing imaging in a state in which a shutter is closed and a second imaging operation of performing imaging in a state in which the shutter is open. The first imaging operation is, for example, an imaging operation performed to generate light shielding data for removing noise contained in image data generated by the second imaging operation. For example, the first imaging operation is performed following the second imaging operation. The first imaging operation is performed under the same exposure condition (for example, exposure time) as the second imaging operation. In the first imaging operation, light shielding exposure that involves exposure (exposure operation) in a light shielding state is performed. In the first imaging operation image data (light shielding data) including only noise of the imaging apparatus is obtained.

The second imaging operation is an imaging operation performed to capture an image of a subject and generate image data. For example, the second imaging operation is performed using long exposure, i.e. exposure for a time longer than a predetermined time, and is performed with the shutter being open for 30 sec or more. In addition to this, the imaging apparatus according to the comparative example may perform normal exposure, i.e. exposure for the predetermined time, in a state in which the shutter is open. The normal exposure is exposure for capturing an image of the subject and generating image data, for example, exposure performed with the shutter being open for a period shorter than 30 sec. The second imaging operation may be performed using the normal exposure.

In FIG. 14, the vertical axis represents the signal level (pixel value), and the horizontal axis represents the pixel position. For example, the respective signal levels of a plurality of pixels arranged in one line are illustrated in FIG. 14. The signal illustrated in FIG. 14 is image data obtained by AD conversion of an analog signal from the plurality of pixels.

(a) in FIG. 14 illustrates image data (long-exposure still image data) obtained by the second imaging operation (for example, long exposure). As illustrated in (a) in FIG. 14, the image data obtained by the long exposure contains signal components according to the brightness of the subject and noise components due to white flaws according to the exposure time. In the long exposure, such white flaws are noticeable. Although the image is a still image in this example, the image may be a moving image.

(b) in FIG. 14 illustrates image data (long light-shielding exposure data) obtained by the first imaging operation. As illustrated in (b) in FIG. 14, the image data obtained by the first imaging operation contains white flaws according to the exposure time.

(c) in FIG. 14 illustrates image data (still image data after noise subtraction) obtained by a process of removing noise from the image data illustrated in (a) in FIG. 14. Specifically, the image data illustrated in (c) in FIG. 14 is image data obtained by subtracting the image data illustrated in (b) in FIG. 14 from the image data illustrated in (a) in FIG. 14 and adding an offset value to the subtraction outcome. As illustrated in (c) in FIG. 14, the white flaws are removed as a result of this process. The offset value is set, for example, in order to remove noise such as dark noise (for example, thermal noise). For example, the offset value is a reference signal level in the second imaging operation. The offset value is, for example, a value (signal level) when subtracting a certain offset signal component from image data after digital conversion.

Here, depending on the physical characteristics and the like of a photoelectric conversion element included in the imaging apparatus, both white flaws and black flaws may occur. The following will describe the case of performing the same noise removal as above in the imaging apparatus including such a photoelectric conversion element, with reference to FIG. 15. FIG. 15 is a second schematic diagram explaining operation when performing correction in the imaging apparatus according to the comparative example. In FIG. 15, the vertical axis represents the signal level, and the horizontal axis represents the pixel position.

Figure 15:
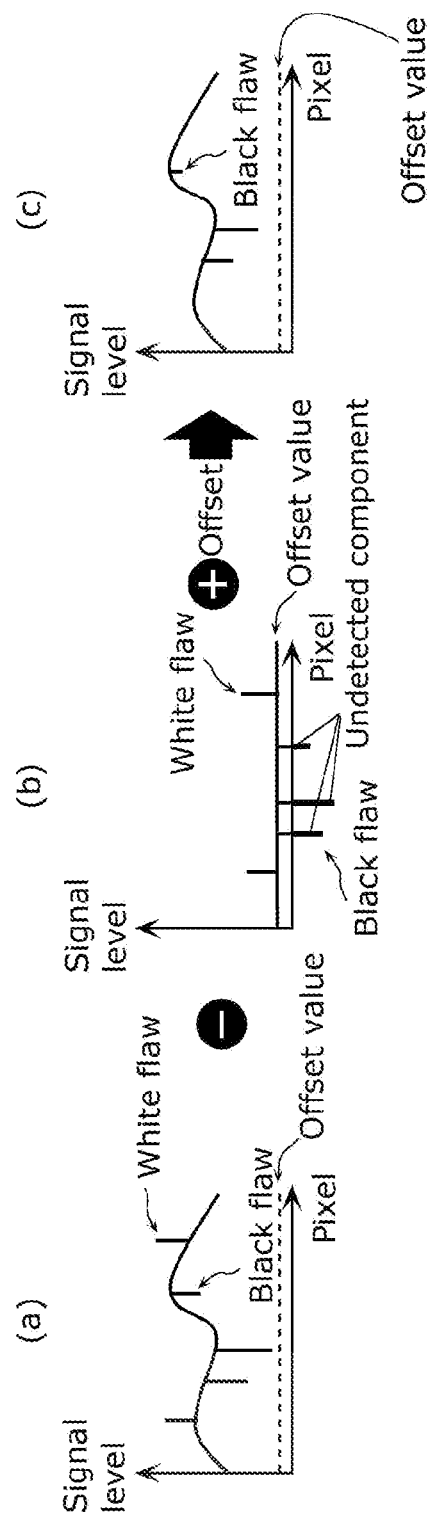
FIG. 15 is a second schematic diagram explaining operation when performing correction in the imaging apparatus according to the comparative example.

(a) in FIG. 15 illustrates image data obtained by the second imaging operation. As illustrated in (a) in FIG. 15, the image data obtained by the second imaging operation contains signal components according to the brightness of the subject and noise components due to white flaws and black flaws according to the exposure time.

(b) in FIG. 15 illustrates image data obtained by the first imaging operation. As illustrated in (b) in FIG. 15, the image data obtained by the first imaging operation contains white flaws and black flaws according to the exposure time. There is, however, an undetected component in the black flaws. That is, the imaging apparatus according to the comparative example cannot appropriately obtain noise (the black flaws in the example in (b) in FIG. 15). This phenomenon occurs because the signal level of the offset value is smaller than the signal level of the black flaw (i.e. the absolute value of the black flaw). Although an example in which the image data obtained by the first imaging operation from among the respective image data obtained by the first imaging operation and the second imaging operation contains an undetected component is illustrated in FIG. 15, an undetected component may also be contained in the image data obtained by the second imaging operation.

(c) in FIG. 15 illustrates image data obtained by a process of removing noise from the image data illustrated in (a) in FIG. 15. Specifically, the image data illustrated in (c) in FIG. 15 is image data obtained by subtracting the image data illustrated in (b) in FIG. 15 from the image data illustrated in (a) in FIG. 15 and adding an offset value to the subtraction outcome. As illustrated in (c) in FIG. 15, the white flaws are removed, but part of the black flaws is unable to be removed.

Thus, with the noise removal method according to the comparative example, in the case where not only white flaws but also black flaws occur, the black flaws may not be appropriately removed. The present inventors accordingly conducted intensive study on how, in the case where both white flaws and black flaws occur, to appropriately obtain both the white flaws and the black flaws. The present inventors then found out that the problem can be solved by adjusting the offset value in the first imaging operation. This will be described in detail below.

An image generation method, an imaging apparatus, and a program according to the present disclosure will be described in detail below, with reference to drawings. The embodiments described below each show a preferable specific example of the present disclosure. The numerical values, shapes, materials, structural elements, the arrangement and connection of the structural elements, steps, the processing order of the steps etc. shown in the following embodiments are mere examples, and do not limit the scope of the present disclosure.

The accompanying drawings and the following description are provided to help a person skilled in the art to fully understand the present disclosure, and are not intended to limit the subject matter defined in the appended claims. Each drawing is a schematic and does not necessarily provide precise depiction.

In the specification, the terms indicating the relationships between elements, such as "equal", the numerical values, and the numerical ranges are not expressions of strict meanings only, but are expressions of meanings including substantially equivalent ranges, for example, a difference of about several percent.

Embodiment

An embodiment will be described below, with reference to FIGS. 1 to 13.

1. Overall Structure of Camera

Figure 1:
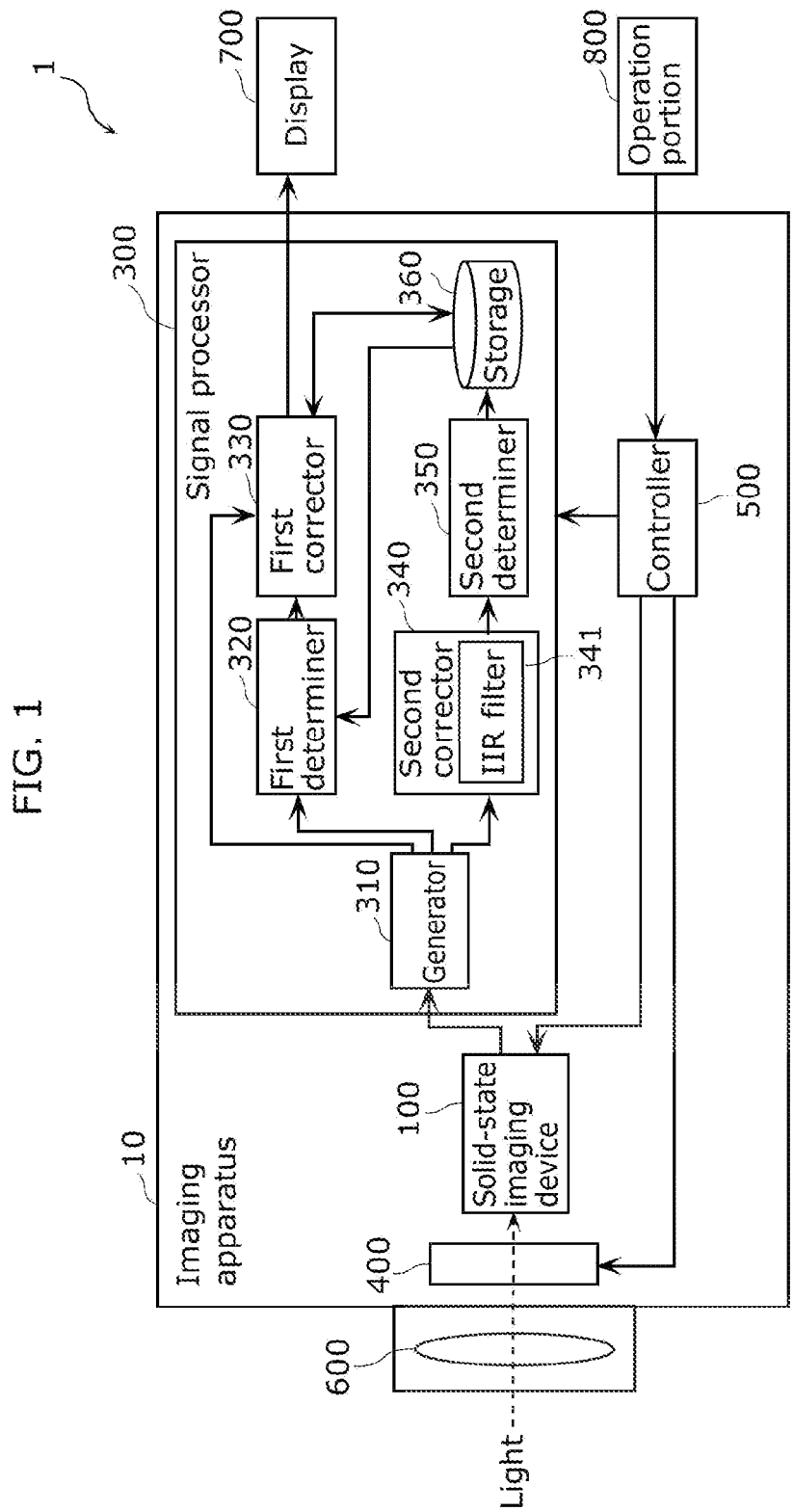
FIG. 1 is a block diagram illustrating the structure of a camera including an imaging apparatus according to an embodiment.
Figure 2:
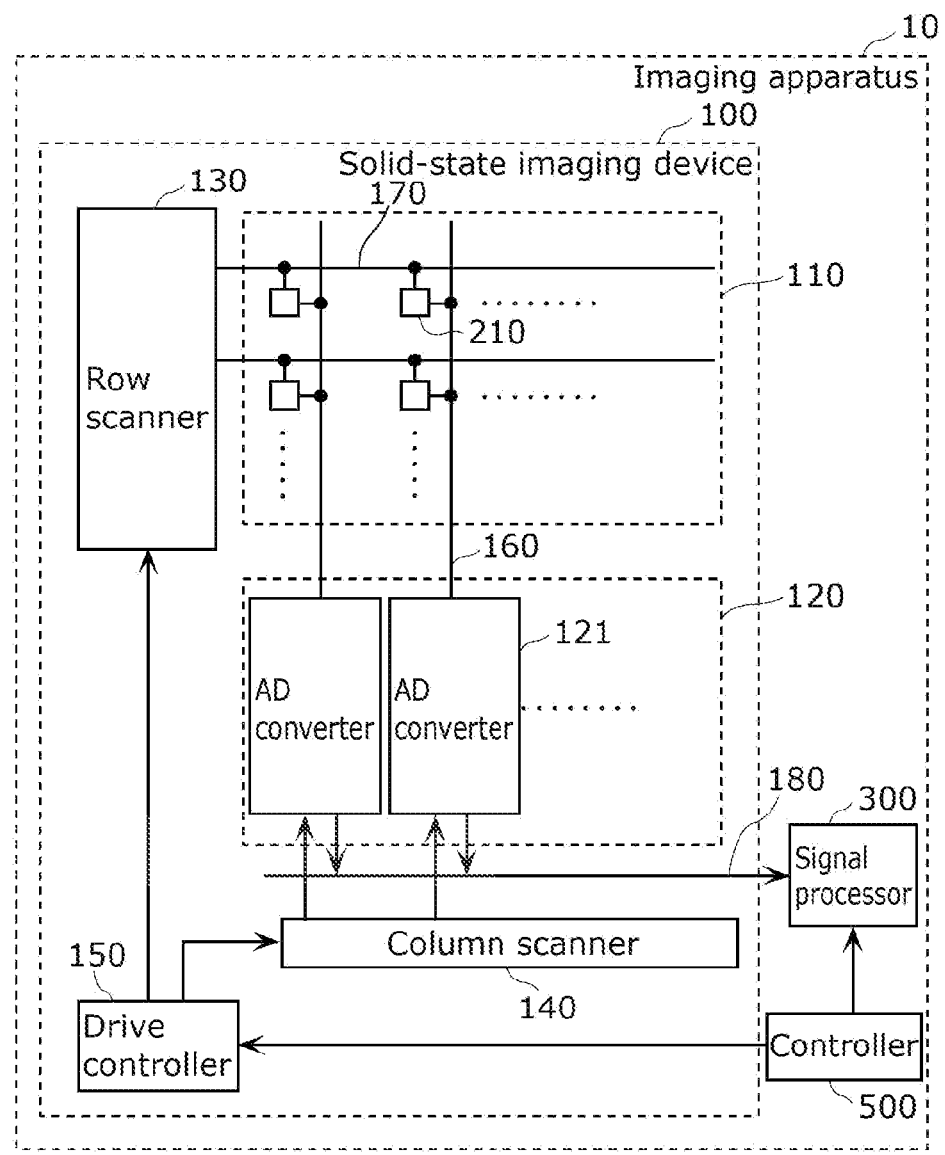
FIG. 2 is a block diagram illustrating the structure of the imaging apparatus according to the embodiment.

The structures of imaging apparatus 10 and camera 1 including imaging apparatus 10 according to this embodiment will be described below, with reference to FIGS. 1 and 2. FIG. 1 is a block diagram illustrating the structure of camera 1 including imaging apparatus 10 according to this embodiment. FIG. 2 is a block diagram illustrating the structure of imaging apparatus 10 according to this embodiment. FIG. 2 is a block diagram illustrating the structure of solid-state imaging device 100 in detail. Shutter 400 is not illustrated in FIG. 2.

As illustrated in FIG. 1, camera 1 according to this embodiment includes imaging apparatus 10, lens 600, display 700, and operation portion 800.

Imaging apparatus 10 captures an image of a subject according to operation (input) by a user, and performs predetermined signal processing on the captured image data. Imaging apparatus 10 performs long exposure, light shielding exposure, and normal exposure. The long exposure and the normal exposure are each exposure performed in a state in which a subject image is formed on an imaging element (the below-described organic photoelectric conversion element in this embodiment) by lens 600 or the like. The long exposure and the normal exposure are performed to obtain image data of a captured image of the subject. The long exposure has a longer exposure time than the normal exposure, and is performed, for example, when capturing an image of a nightscape, night sky, and the like. The normal exposure has a shorter exposure time than the long exposure, i.e. has a normal exposure time, and is performed, for example, when performing normal imaging. In the long exposure and the normal exposure, a reference signal level in imaging is set to the below-described second offset value.

The light shielding exposure is exposure performed in a state in which the formation of a subject image is blocked by shutter 400 or the like. The light shielding exposure is performed to remove noise (noise including white flaws and black flaws) from image data obtained by the long exposure or the like, or obtain image data for identifying a defective pixel. For example, in the case of removing noise from image data obtained by the long exposure, the light shielding exposure is performed for the same exposure time as the long exposure. In the light shielding exposure, a reference signal level in imaging is set to the below-described first offset value.

The light shielding exposure may be executed only in the case where the long exposure is performed from among the long exposure and the normal exposure. A long exposure mode in which the long exposure is performed and a normal exposure mode in which the normal exposure is performed are switchable by operation portion 800. The long exposure and the normal exposure are an example of transmissive exposure. An example in which the transmissive exposure is the long exposure will be described below.

Imaging apparatus 10 includes solid-state imaging device 100, signal processor 300, shutter 400, and controller 500. As illustrated in FIG. 2, solid-state imaging device 100 further includes pixel array portion 110, column AD converter 120, row scanner 130, column scanner 140, and drive controller 150. In pixel array portion 110 and its surrounding region, column signal line 160 is provided for each pixel column, and scan line 170 is provided for each pixel row.

Pixel array portion 110 is an imaging portion in which a plurality of pixels 210 are arranged in a matrix.

Column AD converter (analog-digital converter) 120 is a converter that digitally converts a signal (analog pixel signal) input from each column signal line 160 to obtain, hold, and output a digital value (digital pixel signal) corresponding to the amount of light received by pixel 210.

Row scanner 130 controls reset operation, charge accumulation operation, and read operation for pixels 210 in units of rows.

Column scanner 140 sequentially outputs the digital values of one row held in column AD converter 120 to row signal line 180, to output the digital values to signal processor 300.

Drive controller 150 supplies various control signals to row scanner 130 and column scanner 140, to control these units. For example, drive controller 150 supplies various control signals to row scanner 130 and column scanner 140, based on control signals from controller 500.

Imaging apparatus 10 according to this embodiment is, for example, an imaging apparatus for capturing a still image. Alternatively, imaging apparatus 10 may be an imaging apparatus for capturing a moving image.

Imaging apparatus 10 may include an interface (not illustrated) for communication between external circuitry and at least one of solid-state imaging device 100, signal processor 300, and controller 500. The interface is, for example, a communication port composed of a semiconductor integrated circuit.

Referring back to FIG. 1, lens 600 includes a lens system that can be driven in an optical axis direction. As a result of the lens system being driven in the optical axis direction, light from outside of imaging apparatus 10 is focused onto pixel array portion 110.

Display 700 is a display device capable of displaying images generated by signal processor 300. An example of display 700 is a liquid crystal monitor. Display 700 is also capable of displaying various configuration information in the camera. For example, display 700 can display imaging conditions (aperture, ISO sensitivity, etc.) during imaging.

Operation portion 800 is an input unit that receives input from the user. Examples of operation portion 800 include a release button and a touch panel. For example, the touch panel is bonded to the liquid crystal monitor. Operation portion 800 receives an imaging instruction, a change in imaging conditions, and the like from the user. Operation portion 800 may obtain input from the user by voice, gesture, etc.

2. Structure of Solid-State Imaging Device

Figure 3:
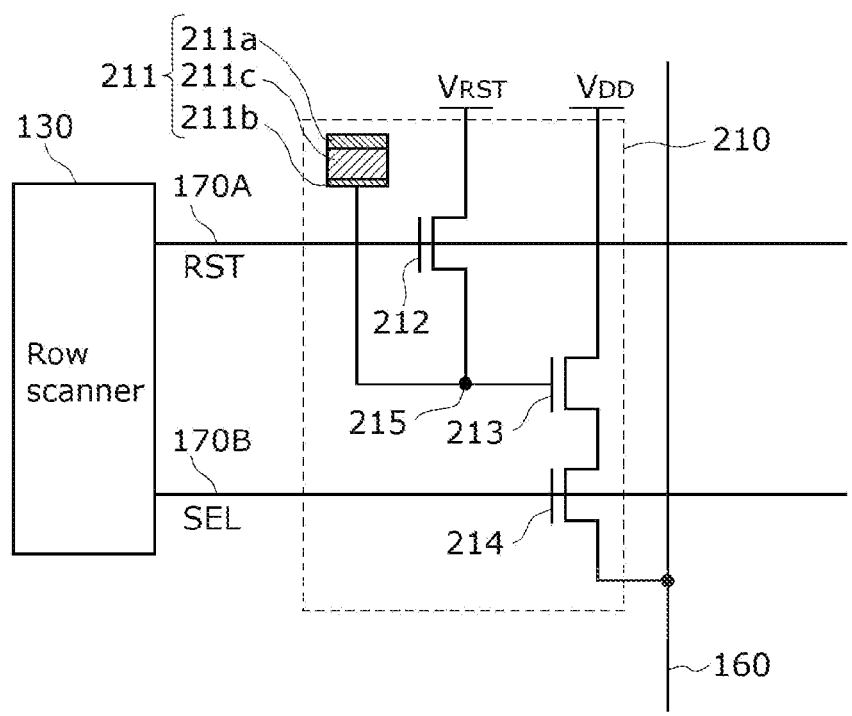
FIG. 3 is a diagram illustrating an example of the circuit structure of a pixel according to the embodiment.

The structure of solid-state imaging device 100 will be described in more detail below, with reference to FIG. 3. FIG. 3 is a diagram illustrating an example of the circuit structure of pixel 210 according to this embodiment.
[2-1. Pixel]

As illustrated in FIG. 3, pixel 210 includes photoelectric conversion element 211, reset transistor 212, amplification transistor 213, selection transistor 214, and charge accumulator 215.

Photoelectric conversion element 211 is a photoelectric converter that photoelectrically converts received light into a signal charge (pixel charge). Specifically, photoelectric conversion element 211 is composed of upper electrode 211a, lower electrode 211b, and photoelectric conversion film 211c sandwiched between the two electrodes. Photoelectric conversion film 211c is a film made of a photoelectric conversion material that generates a charge according to received light. In this embodiment, photoelectric conversion film 211c is an organic photoelectric conversion film containing organic molecules having high light absorption function. In other words, in this embodiment, photoelectric conversion element 211 is an organic photoelectric conversion element including an organic photoelectric conversion film, and solid-state imaging device 100 is an organic sensor using the organic photoelectric conversion element. The organic photoelectric conversion film is formed across the plurality of pixels 210. Each of the plurality of pixels 210 includes the organic photoelectric conversion film.

The organic photoelectric conversion film is varied in light transmittance, as a result of the voltage applied to the organic photoelectric conversion film being made variable. That is, a shutter function can be realized by adjusting the voltage applied to the organic photoelectric conversion film. Hence, all of the plurality of pixels 210 including the organic photoelectric conversion film can be put in a light shielding state substantially simultaneously. A global shutter can thus be realized without adding elements such as memory. Therefore, it is possible to reduce distortion (rolling distortion) caused by reading by a rolling shutter.

The thickness of photoelectric conversion film 211c is, for example, approximately 500 nm. Photoelectric conversion film 211c is formed using, for example, a vacuum vapor deposition method. The organic molecules have a high light absorption function over an entire visible light range of approximately 400 nm to 700 nm in wavelength.

Photoelectric conversion element 211 included in pixel 210 according to this embodiment is not limited to being formed by the foregoing organic photoelectric conversion film, and may, for example, be a photodiode made of an inorganic material.

Upper electrode 211a is an electrode opposite to lower electrode 211b, and is formed on photoelectric conversion film 211c so as to cover photoelectric conversion film 211c. That is, upper electrode 211a is formed across the plurality of pixels 210. Upper electrode 211a is made of a transparent conductive material (for example, indium tin oxide (ITO)) in order to allow light to enter photoelectric conversion film 211c.

Lower electrode 211b is an electrode for extracting electrons or holes generated in photoelectric conversion film 211c between lower electrode 211b and upper electrode 211a arranged opposite to each other. Lower electrode 211b is formed for each pixel 210. Lower electrode 211b is made of, for example, Ti, TiN, Ta, or Mo.

Charge accumulator 215 is connected to photoelectric conversion element 211, and accumulates a signal charge extracted via lower electrode 211b.

Reset transistor 212 has its drain supplied with reset voltage $V_{RST}$ and its source connected to charge accumulator 215, and resets (initializes) the potential of charge accumulator 215. Specifically, as a result of the gate of reset transistor 212 being supplied with a predetermined voltage from row scanner 130 through reset scan line 170A (i.e. turned on), reset transistor 212 resets the potential of charge accumulator 215. As a result of the supply of the predetermined voltage being stopped, the signal charge is accumulated in charge accumulator 215 (i.e. exposure is started).

In this embodiment, second reset voltage $V_{RST2}$ supplied to the drain of reset transistor 212 before the long exposure starts and first reset voltage $V_{RST1}$ supplied to the drain of reset transistor 212 before the light shielding exposure starts are different voltages.

Amplification transistor 213 has its gate connected to charge accumulator 215 and its drain supplied with power voltage $V_{DD}$, and outputs an analog pixel signal corresponding to the amount of signal charge accumulated in charge accumulator 215.

Selection transistor 214 has its drain connected to the source of amplification transistor 213 and its source connected to column signal line 160, and determines the timing of outputting the analog pixel signal from amplification transistor 213. Specifically, as a result of a predetermined voltage being supplied from row scanner 130 to the gate of selection transistor 214 through selection scan line 170B, the analog pixel signal is output from amplification transistor 213.

Pixel 210 having the structure described above can be read non-destructively. Herein, "non-destructive reading" denotes reading, without destroying the charge (signal charge) accumulated in charge accumulator 215, an analog pixel signal corresponding to the amount of charge during exposure. Herein, "during exposure" denotes any timing in an exposure period.

[2-2. Other Structures]

Column AD converter 120 is composed of AD converters 121 provided for respective column signal lines 160. Each AD converter 121 is, for example, a 14-bit AD converter. For example, each AD converter 121 digitally converts an analog pixel signal output from pixel 210 by ramp method, to output a digital value corresponding to the amount of light received by pixel 210. AD converter 121 includes a comparator and an up/down counter (not illustrated).

Herein, "AD conversion by ramp method" is AD conversion using a ramp wave, i.e. a method whereby, when an analog pixel signal (input signal) is input, a ramp wave whose voltage increases in a certain slope is caused to rise, the time from the point of rise to when both signals (input signal and ramp wave) match in voltage is measured, and the measured time is output as a digital value. The comparator compares the voltage of the analog pixel signal (input signal) and the voltage of the reference signal input as the ramp wave, and outputs a signal indicating the timing at which the voltage of the reference signal matches the voltage of the column signal.

The up/down counter counts down (or counts up) in the period from when the reference signal is input to the comparator to when the reference signal reaches the voltage of the analog pixel signal indicating a base component, and then counts up (or counts down) in the period from when the reference signal is input to the comparator to when the reference signal reaches the voltage of the analog pixel signal indicating a signal component. In this way, the up/down counter eventually holds a digital pixel signal corresponding to the difference obtained by subtracting the base component from the signal component of the analog pixel signal. The analog pixel signal indicating the base component is a pixel signal output from pixel 210 to AD converter 121 at a reset level (for example, second offset value). The analog pixel signal indicating the signal component is a pixel signal output from pixel 210 to AD converter 121 when a charge is accumulated as a result of exposure operation.

The digital values held in the respective up/down counters are sequentially output to row signal line 180, and output to signal processor 300 via an output circuit (such as an output buffer (not illustrated)).

Drive controller 150 controls row scanner 130 and column scanner 140, to control reset operation, charge accumulation operation, and read operation in each pixel 210 or digital pixel signal output operation from each AD converter 121 to signal processor 300.

For example, upon receiving a read instruction from controller 500, drive controller 150 controls row scanner 130 to apply a predetermined voltage sequentially to selection scan lines 170B to output analog pixel signals to AD converter 120. Drive controller 150 also controls column scanner 140 to sequentially output digital pixel signals held in AD converters 121 to signal processor 300.

3. Structure of Signal Processor

Signal processor 300 will be described below, with reference to FIG. 1.

Signal processor 300 performs a process of subjecting each digital pixel signal obtained from solid-state imaging device 100 to predetermined signal processing to generate image data and storing and outputting the generated image data. For example, signal processor 300 outputs the generated image data to display 700. For example, signal processor 300 stores the image data in storage 360 or an external storage device (for example, USB memory).

As illustrated in FIG. 1, signal processor 300 includes generator 310, first determiner 320, first corrector 330, second corrector 340, second determiner 350, and storage 360. First determiner 320 and first corrector 330 are provided to execute a process of removing white flaws and black flaws from image data obtained by the second imaging operation. Second corrector 340 and second determiner 350 are provided to execute a process (pixel refresh) of detecting defective pixels. The term "defective pixel" denotes, for example, a pixel having white flaws or black flaws mentioned above.

Generator 310 is a processor that performs predetermined signal processing on each digital pixel signal obtained from solid-state imaging device 100 to generate image data. For example, generator 310 generates image data (an example of first image data) based on a digital pixel signal (an example of a first pixel signal) obtained by the first imaging operation, and generates image data (an example of second image data) based on a digital pixel signal (an example of a second pixel signal) obtained by the second imaging operation.

First determiner 320 is a processor that determines whether the second image data generated by generator 310 contains any underexposed or overexposed pixel. In this embodiment, first determiner 320 performs the determination only for defective pixels from among pixels 210 of defective pixels and non-defective pixels.

First corrector 330 is a processor that performs a noise removal process of correcting the second image data to remove white flaws and black flaws. First corrector 330 generates third image data from which white flaws and black flaws have been removed, based on the second image data and the first image data. Specifically, based on the first image data and the second image data obtained from generator 310 and the determination result obtained from first determiner 320, first corrector 330 subtracts the first image data from the second image data to generate the third image data.

Second corrector 340 is a processor that performs, on the first image data obtained from generator 310, a correction process according to the shading characteristics of each of the plurality of pixels 210. For example, second corrector 340 includes one or more filters. In this embodiment, second corrector 340 includes infinite impulse response (IIR) filter 341. For example, in the case where each of the plurality of pixels 210 has shading characteristics, IIR filter 341 is used to obtain the shading amount (for example, local shading amount) of each of the plurality of pixels 210.

Second corrector 340 may include filters other than IIR filter 341. From the viewpoint of obtaining a more accurate local shading amount, however, second corrector 340 preferably includes IIR filter 341. Since IIR filter 341 can remove, from the first image data containing components of white flaws and black flaws, the components of white flaws and black flaws (described in detail alter), a more accurate local shading amount can be obtained (see FIG. 11).

Second determiner 350 is a processor that performs a process of identifying any defective pixel from among the plurality of pixels 210 based on the corrected first image data obtained from second corrector 340. For example, second determiner 350 determines, for each of the plurality of pixels 210 in the first image data, whether the pixel value of pixel 210 is outside a predetermined range, thus identifying any defective pixel. Second determiner 350 stores position information indicating the position of pixel 210 that is a defective pixel, in storage 360.

Storage 360 is a storage device that stores programs executed by the processers in signal processor 300, information necessary to execute the programs, and the like. Storage 360 is, for example, semiconductor memory. Storage 360 may be, for example, dynamic random access memory (DRAM) or ferroelectric memory. Storage 360 may be not included in signal processor 300, as long as it is included in imaging apparatus 10. Storage 360 also functions as work memory for the processers in signal processor 300.

Shutter 400 controls the time for the light flux from lens 600 to reach pixel array portion 110, and is a mechanical shutter configured to travel a shutter curtain, such as a focal plane shutter. The opening/closing operation of shutter 400 is controlled by controller 500.

Controller 500 controls various structural elements in imaging apparatus 10. Controller 500 controls solid-state imaging device 100, signal processor 300, and shutter 400, based on input from operation portion 800. For example, controller 500 drives solid-state imaging device 100, to output each digital pixel signal from solid-state imaging device 100 to signal processor 300. Controller 500 may also adjust the voltage applied to the organic photoelectric conversion film, to control exposure start and exposure end. For example, controller 500 applies a predetermined voltage to the organic photoelectric conversion film to set a transmission state, and stops applying the voltage to the organic photoelectric conversion film to set a light shielding state.

Moreover, controller 500 controls signal processor 300 to execute predetermined signal processing. Controller 500 controls solid-state imaging device 100 and the opening/closing operation of shutter 400, to switch between the first imaging operation and the second imaging operation.

In this embodiment, controller 500 further controls solid-state imaging device 100 so that reset voltage $V_{RST}$ supplied to the drain of reset transistor 212 will be different between the first imaging operation and the second imaging operation. Specifically, controller 500 controls a power source (not illustrated) for supplying reset voltage $V_{RST}$ so that an offset value (an example of a first offset value) in the first imaging operation is higher than an offset value (an example of a second offset value) in the second imaging operation.

When operation portion 800 receives an imaging instruction from the user, controller 500 may control lens 600 (specifically, a motor for controlling the position of lens 600), to adjust the degree of focus of external light and the like.

For example, controller 500 executes this process by reading a program from memory (not illustrated) and executing the read program.

4. Processes by Imaging Apparatus

Figure 4:
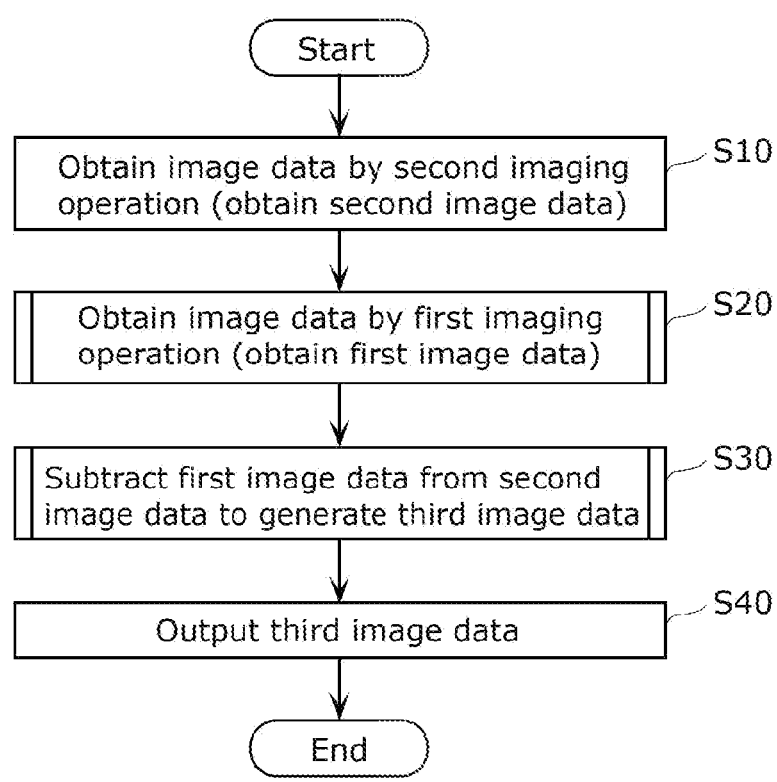
FIG. 4 is a flowchart illustrating operation when performing correction in the imaging apparatus according to the embodiment.
Figure 5:
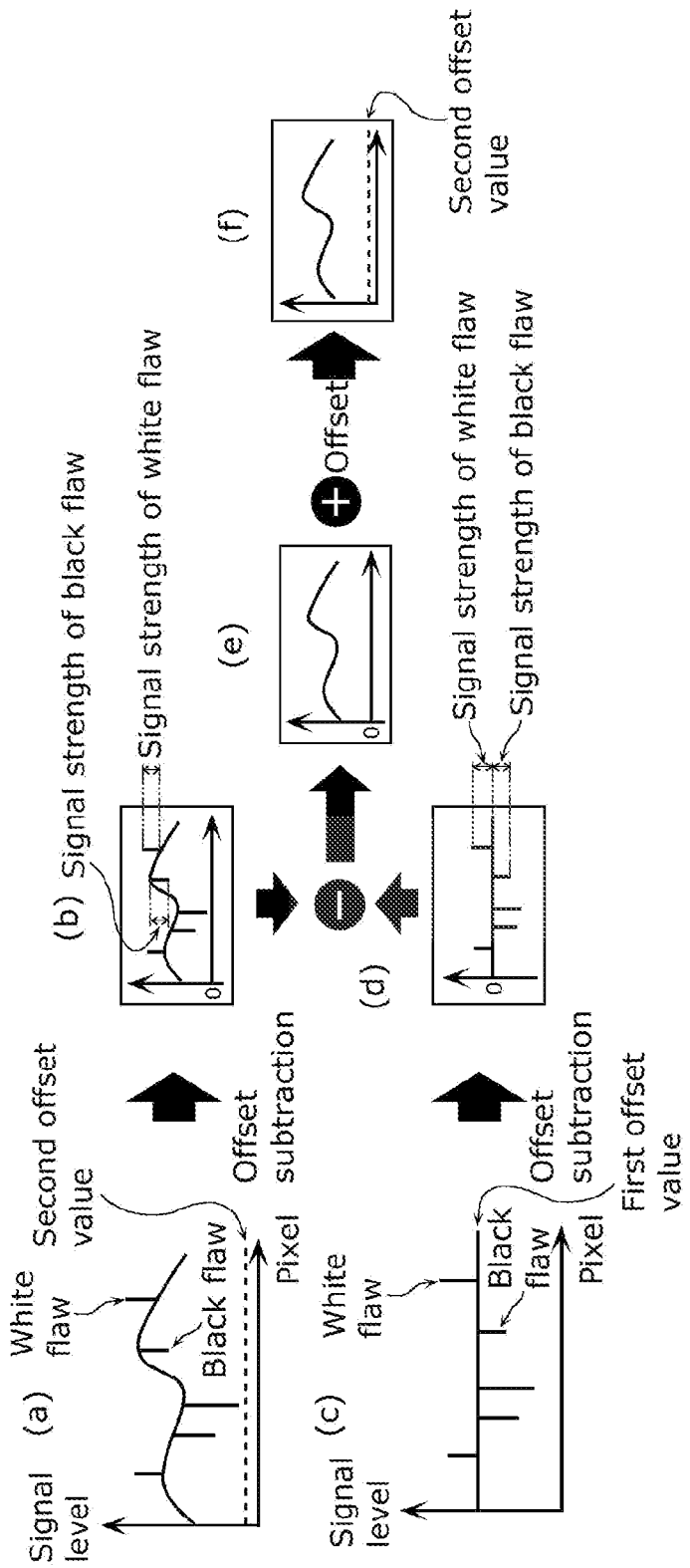
FIG. 5 is a schematic diagram explaining operation when performing correction in the imaging apparatus according to the embodiment.

The processes executed by imaging apparatus 10 will be described below, with reference to FIGS. 4 to 12. First, the process of removing white flaws and black flaws contained in image data obtained by imaging will be described below, with reference to FIGS. 4 to 8B. FIG. 4 is a flowchart illustrating operation when performing correction in imaging apparatus 10 according to this embodiment. FIG. 5 is a schematic diagram explaining operation when performing correction in imaging apparatus 10 according to this embodiment. In each of (a) to (f) in FIG. 5, the vertical axis represents the signal level, and the horizontal axis represents the pixel position.

As illustrated in FIG. 4, imaging apparatus 10 obtains image data (an example of second image data) by the second imaging operation (S10). For example, the second imaging operation is performed using the long exposure, where exposure is performed for a first period (for example, about 30 sec to 60 sec) in a state in which shutter 400 is open (transmission state) and charge accumulator 215 accumulates a charge. In other words, charge accumulation in the first period is executed in Step S10.

Specifically, in Step S10, controller 500 turns on reset transistor 212 in a state in which shutter 400 is closed (light shielding state), to reset the potential of charge accumulator 215. Here, second reset voltage $V_{RST2}$ is a voltage value (second reset voltage) corresponding to the second offset value. Controller 500 then controls shutter 400 to open so that photoelectric conversion element 211 can receive light, and turns off reset transistor 212. Consequently, a charge corresponding to the amount of light received by photoelectric conversion element 211 is accumulated in charge accumulator 215.

When the exposure in the first period ends, controller 500 controls drive controller 150 to sequentially output the digital pixel signals corresponding to the accumulated charges to signal processor 300.

Signal processor 300 thus obtains image data containing white flaws and black flaws, for example as illustrated in (a) in FIG. 5. Generator 310 performs a predetermined process on the obtained image data. For example, generator 310 executes offset subtraction on the obtained image data (specifically, subtracts the second offset value from the image data), to generate offset-subtracted image data (an example of second image data) as illustrated in (b) in FIG. 5. The offset subtraction is a process of subtracting a certain offset signal component from image data. In the offset subtraction in this embodiment, the second offset value is subtracted from the image data. The second offset value is a reference signal level in the second imaging operation.

Generator 310 outputs the generated second image data to first determiner 320 and first corrector 330. Step S10 is an example of a second imaging step and a second generation step.

Next, imaging apparatus 10 obtains image data (an example of first image data) by the first imaging operation (S20). The first imaging operation is exposure performed for the first period in a state in which shutter 400 is closed (light shielding state) and charge accumulator 215 accumulates a charge. For example, the exposure time in Step S10 and the exposure time in Step S20 are the same. The exposure time in Step S20 is a period during which a charge is accumulated in the light shielding state.

Figure 6:
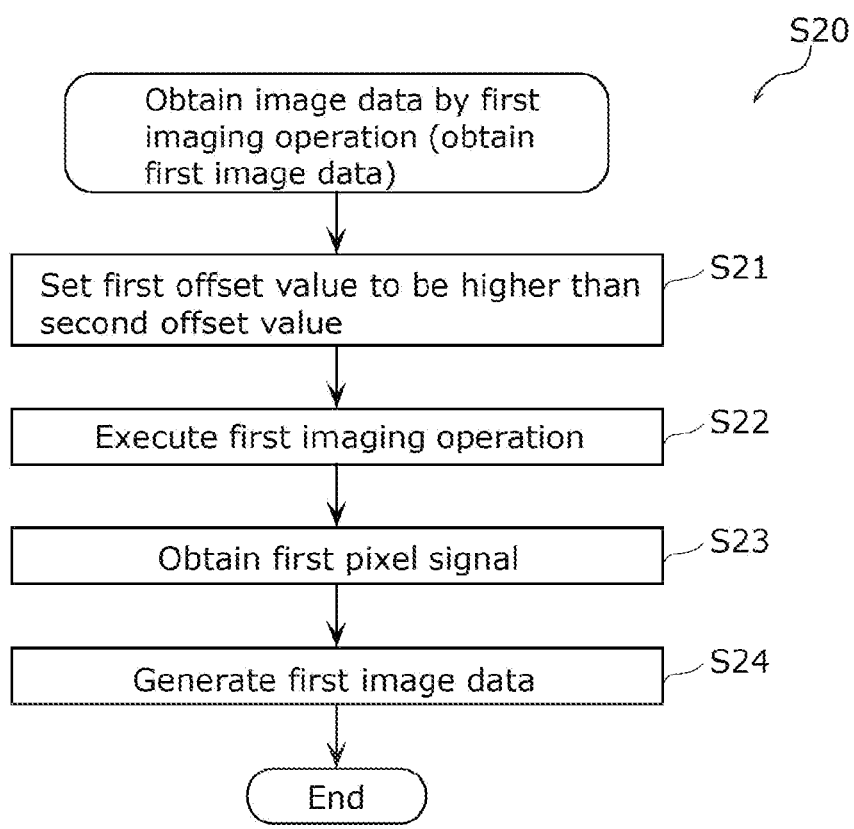
FIG. 6 is a flowchart illustrating operation when obtaining first image data in the imaging apparatus according to the embodiment.

The process of obtaining image data by the first imaging operation will be described below, with reference to FIG. 6. FIG. 6 is a flowchart illustrating operation when obtaining the first image data in imaging apparatus 10 according to this embodiment.

As illustrated in FIG. 6, controller 500 sets the first offset value which is a reference signal level in the first imaging operation, to a value higher than the second offset value (S21). Specifically, controller 500 sets the first offset value to a value higher than the second offset value, by controlling the voltage value of first reset voltage $V_{RST1}$. In other words, controller 500 controls the voltage value of first reset voltage $V_{RST1}$ so that the signal level reference value in the first imaging operation will be a signal level corresponding to the first offset value. The second offset value is set before the first offset value. The second offset value is set beforehand according to the exposure time and the like, and may be stored in storage 360.

Thus, controller 500 sets the offset value when accumulating a charge while shielding light (i.e. when obtaining light shielding data), to a value higher than the offset value when accumulating a charge without shielding light (i.e. when obtaining image data).

Controller 500 may set the first offset value so that there will be no undetected component for both white flaws and black flaws. Controller 500 may set the first offset value to a signal level between 10% and 90% of the maximum value of the signal level (pixel value) after digital conversion. Controller 500 more preferably sets the first offset value to a signal level between 20% and 80% of the maximum value of the signal level (pixel value), and further preferably sets the first offset value to a signal level between 30% and 70% of the maximum value of the signal level (pixel value). In the case where the white flaws and the black flaws are approximately equal in signal level, controller 500 may set the second offset value to approximately 50% of the maximum value of the signal level (pixel value). In the case where the signal level (pixel value) after digital conversion is expressed in 14 bits (0 to 16383), controller 500 may set the first offset value to a pixel value of about 8000.

In Step S21, first, controller 500 turns on reset transistor 212 in a state in which shutter 400 is closed (light shielding state), to reset the potential of charge accumulator 215. Here, first reset voltage $V_{RST1}$ is a voltage value corresponding to the first offset value. The first reset voltage is a voltage different from the second reset voltage. The first reset voltage is, for example, a voltage higher than the second reset voltage.

Next, controller 500 performs control to execute the first imaging operation (S22). Controller 500 sets the offset value to the first offset value, and causes charge accumulation in the light shielding state. Specifically, controller 500 turns off reset transistor 212 while maintaining the state in which shutter 400 is closed (light shielding state), to cause charge accumulation in a second period. Consequently, a charge corresponding to pixel defects is accumulated in charge accumulator 215. In charge accumulator 215 of pixel 210 having no defects, substantially no charge is accumulated. In charge accumulator 215 of pixel 210 having no defects, the charge corresponding to the second reset voltage remains accumulated. Step S22 is an example of a first imaging step.

For example, the length of the first period and the length of the second period are equal. This makes the signal strength of white flaws and black flaws contained in the generated first image data equal to the signal strength of white flaws and black flaws contained in the second image data, so that white flaws and black flaws can be removed effectively by the below-described process. The signal strength of a white flaw contained in the first image data denotes the difference between the signal level of pixel 210 in which the white flaw occurs and the signal level in the case where the white flaw does not occur in pixel 210. The signal strength of a black flaw contained in the first image data denotes the difference between the signal level of pixel 210 in which the black flaw occurs and the signal level in the case where the black flaw does not occur in pixel 210. The first period and the second period are not limited to being equal.

Next, after the charge accumulation in the first period ends, generator 310 obtains each pixel signal (first pixel signal) from solid-state imaging device 100 (S23). Specifically, controller 500 controls drive controller 150 to sequentially output the digital pixel signals corresponding to the accumulated charges to signal processor 300 (for example, generator 310). Signal processor 300 thus obtains image data containing white flaws and black flaws, for example as illustrated in (c) in FIG. 5.

Next, generator 310 performs a predetermined process on the obtained image data to generate first image data (S24). For example, generator 310 performs offset subtraction on the obtained image data (specifically, subtracts the first offset value from the image data) to obtain offset-subtracted image data (an example of first image data), for example as illustrated in (d) in FIG. 5. Step S24 is an example of a first generation step.

Generator 310 outputs the generated first image data to first corrector 330. Generator 310 may further output the generated first image data to second corrector 340. This makes it possible to execute the below-described process of identifying a defective pixel using the first image data generated in the subject imaging process.

Referring back to FIG. 4, signal processor 300 then subtracts the first image data from the second image data to generate third image data (S30). For example, signal processor 300 subtracts the image data (an example of first image data) illustrated in (d) in FIG. 5 from the image data (an example of second image data) illustrated in (b) in FIG. 5 to generate image data (still image data after dark subtraction) illustrated in (e) in FIG. 5, and adds the second offset value to the image data to generate image data (still image data after offset addition) illustrated in (f) in FIG. 5. The image data illustrated in (f) in FIG. 5 is an example of third image data. Step S30 is an example of a third generation step.

Figure 7:
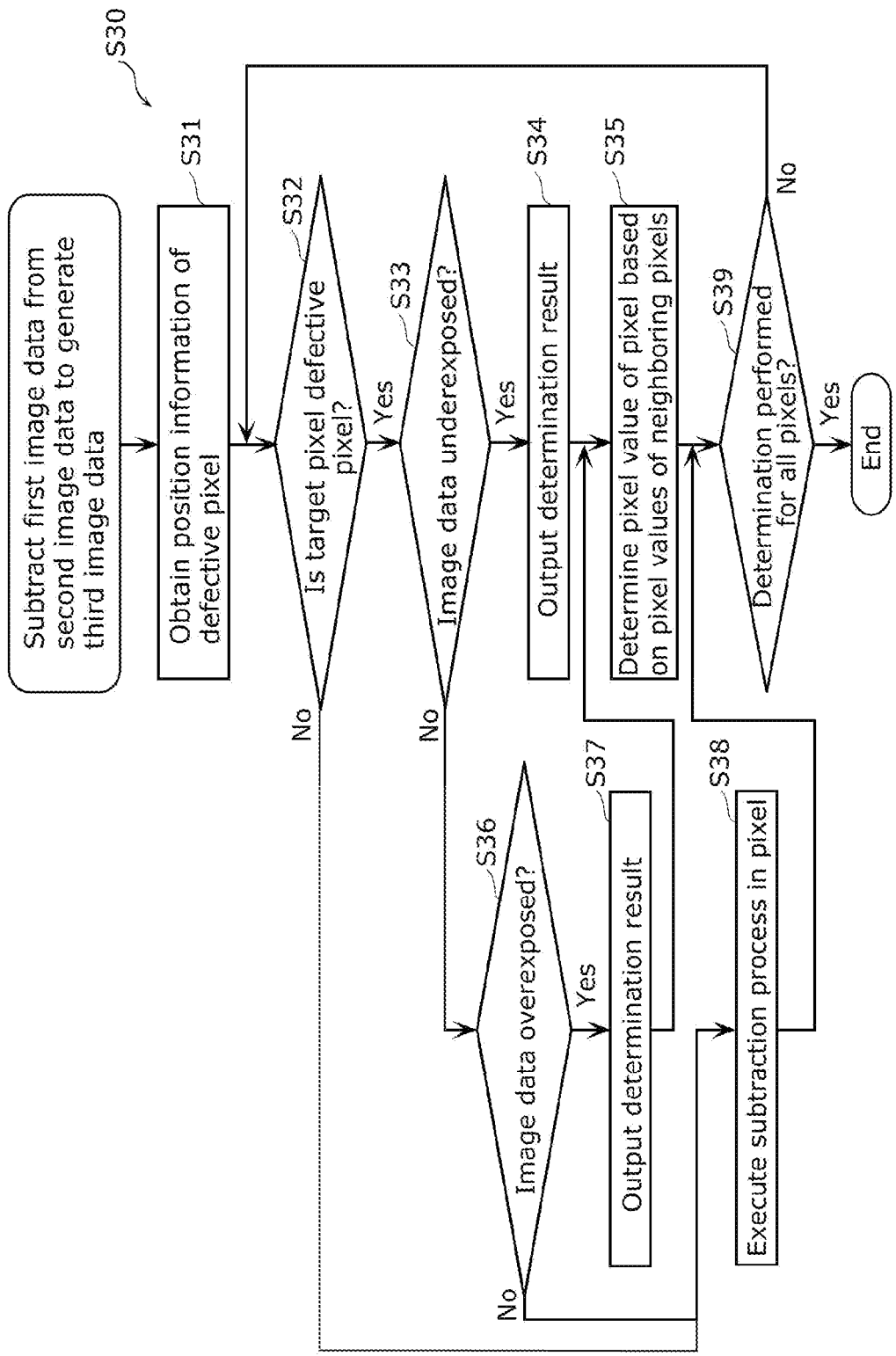
FIG. 7 is a flowchart illustrating operation when generating third image data in the imaging apparatus according to the embodiment.

The process of generating the third image data will be described below, with reference to FIG. 7. FIG. 7 is a flowchart illustrating operation when generating the third image data in imaging apparatus 10 according to this embodiment.

As illustrated in FIG. 7, first, first determiner 320 obtains position information indicating the position of each defective pixel (S31). For example, first determiner 320 reads the position information of each defective pixel stored in storage 360.

Next, first determiner 320 determines, for each pixel, whether the pixel (target pixel subjected to determination) is a defective pixel (S32). First determiner 320 performs the determination, for example, based on the position information of each defective pixel.

Next, in the case where the target pixel is a defective pixel (S32: Yes), first determiner 320 determines whether the image data (for example, the image indicated by the image data) is underexposed (S33). First determiner 320 determines whether the image data is underexposed, based on the pixel value of the defective pixel. For example, underexposure means that the pixel value of the defective pixel is less than or equal to the second offset value.

Specifically, first determiner 320 determines whether the pixel value of the defective pixel identified by the obtained position information is less than or equal to a first threshold. In the case where the pixel value of the defective pixel is less than or equal to the first threshold, first determiner 320 determines that the defective pixel is underexposed. The first threshold is set to, for example, a value with which whether the defective pixel is underexposed can be determined. For example, the first threshold is a value equal in signal level (pixel value) to the second offset value or slightly higher in signal level (pixel value) than the second offset value (for example, a value of about 1.1 times the signal level of the second offset value).

Figure 8A:
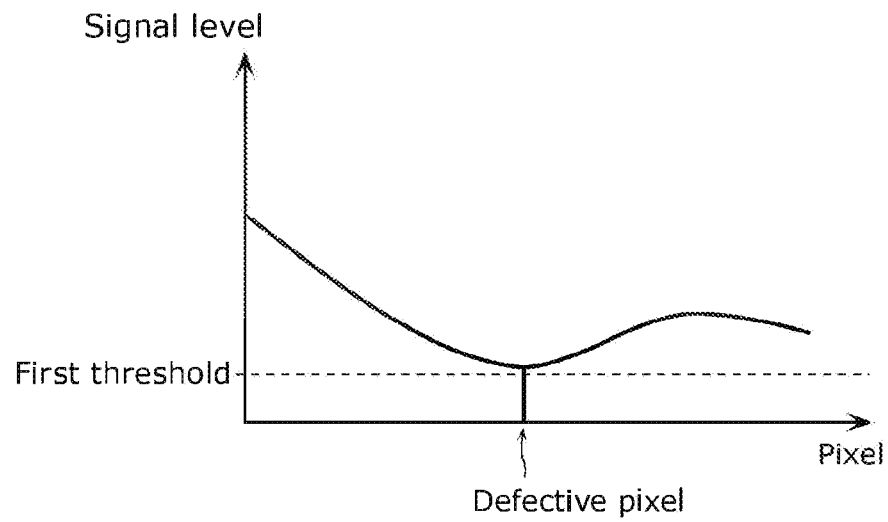
FIG. 8A is a diagram illustrating an example of underexposed image data.

FIG. 8A illustrates an example of underexposed image data. In the case where the pixel value of the defective pixel is less than or equal to the first threshold as illustrated in FIG. 8A, first determiner 320 determines that the defective pixel is underexposed.

In Step S33, first determiner 320 may further determine whether pixels 210 neighboring (i.e. around) the underexposed defective pixel are underexposed. For example, first determiner 320 may determine, based on the pixel value of each pixel 210 (normal pixel) neighboring the defective pixel and the first threshold, whether pixel 210 neighboring the defective pixel is underexposed.

For example, in the case where the pixel value of at least one pixel 210 of pixels 210 neighboring the defective pixel is less than or equal to the first threshold, first determiner 320 determines that pixel 210 neighboring the defective pixel is underexposed. For example, FIG. 8A illustrates the case where pixel 210 neighboring the defective pixel is not underexposed.

In the case where first determiner 320 determines that the defective pixel is underexposed (S33: Yes), first determiner 320 outputs the determination result to first corrector 330 (S34). For example, first determiner 320 outputs information for identifying the underexposed defective pixel, to first corrector 330. The process then advances to Step S35.

In the case where first determiner 320 determines that the image data (for example, the image indicated by the image data) is not underexposed (S33: No), first determiner 320 further determines whether the image data (for example, the image indicated by the image data) is overexposed (S36). For example, overexposure means that the pixel value (signal level) of the defective pixel is saturated.

Specifically, for example, first determiner 320 determines whether the pixel value of the defective pixel determined as No in Step S33 is greater than or equal to a second threshold. In the case where the pixel value of the defective pixel is greater than or equal to the second threshold, first determiner 320 determines that the image data (for example, the image indicated by the image data) is overexposed. The second threshold is set to, for example, a value with which whether the defective pixel is overexposed can be determined. For example, the second threshold is a value higher in signal level (pixel value) than the first offset value. The second threshold may be set to, for example, the maximum pixel value which imaging apparatus 10 can take.

Figure 8B:
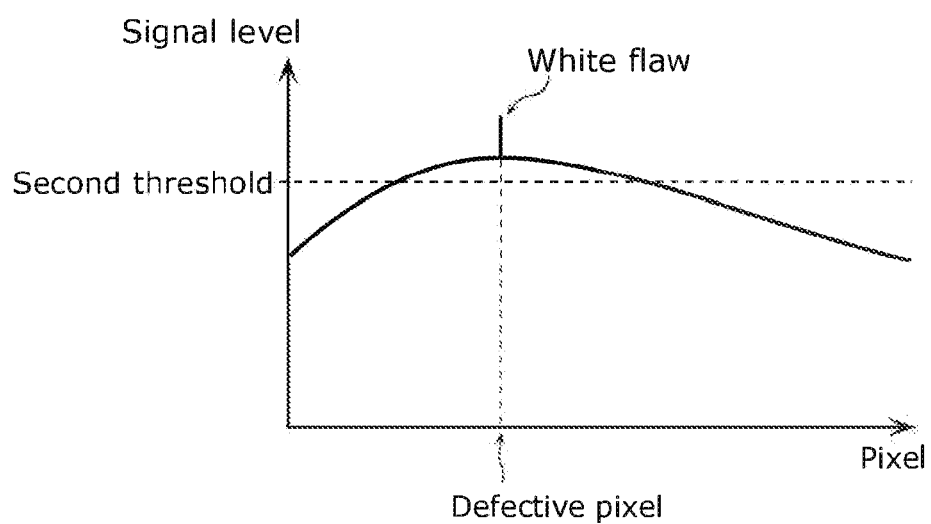
FIG. 8B is a diagram illustrating an example of overexposed image data.

FIG. 8B illustrates an example of overexposed image data. In the case where the pixel value of the defective pixel is greater than or equal to the second threshold as illustrated in FIG. 8B, first determiner 320 determines that the defective pixel is overexposed.

In Step S36, first determiner 320 may further determine whether pixels 210 neighboring the overexposed defective pixel are overexposed. For example, first determiner 320 may determine, based on the pixel value of each pixel 210 (normal pixel) neighboring the defective pixel and the first threshold, whether pixel 210 neighboring the defective pixel is overexposed.

For example, in the case where the pixel value of at least one pixel 210 of pixels 210 neighboring the defective pixel is greater than or equal to the second threshold, first determiner 320 determines that pixel 210 neighboring the defective pixel is overexposed. For example, FIG. 8B illustrates the case where pixel 210 neighboring the defective pixel is not overexposed (i.e. pixel 210 neighboring the defective pixel is saturated).

In the case where first determiner 320 determines that the image data (for example, the image indicated by the image data) is overexposed (S36: Yes), first determiner 320 outputs the determination result to first corrector 330 (S37). For example, first determiner 320 outputs information for identifying the overexposed defective pixel, to first corrector 330. The process then advances to Step S35.

The first threshold and the second threshold are, for example, stored in storage 360 beforehand.

In the case where the pixel is underexposed or overexposed, there is an undetected component of a black flaw or a white flaw in the long exposure. In the example in FIG. 8A, a black flaw component less than or equal to the first threshold is an undetected component. In the example in FIG. 8B, a white flaw component greater than or equal to the second threshold is an undetected component. In the case where the subtraction process is performed when there is an undetected component of a black flaw or a white flaw, the second image data cannot be appropriately corrected (i.e. noise cannot be removed). Hence, first corrector 330 does not perform the subtraction process for such a defective pixel.

Next, first corrector 330 determines the pixel value of the defective pixel (the pixel) determined as underexposed or overexposed by first determiner 320, based on the pixel values of pixels 210 (normal pixels) neighboring the defective pixel (S35). For example, first corrector 330 determines the average value of the pixel values of neighboring pixels 210, as the pixel value of the defective pixel. This process is executed, for example, using a filter such as a median filter (not illustrated) included in first corrector 330. First corrector 330 is not limited to determining the average value of the pixel values of neighboring pixels 210 as the pixel value of the defective pixel, and may determine the maximum value, the minimum value, the median value, the mode value, or the like of the pixel values of neighboring pixels 210 as the pixel value of the defective pixel.

Thus, first corrector 330 does not perform the subtraction process on the defective pixel (the pixel) determined as underexposed or overexposed by first determiner 320.

In the case where pixel 210 neighboring the defective pixel is underexposed or overexposed, first corrector 330 need not perform the process in Step S35 for the defective pixel. This is because the pixel value of pixel 210 neighboring the defective pixel for complementing the pixel value of the defective pixel is not an accurate value.

In the case where first determiner 320 determines that the defective pixel is neither underexposed nor overexposed (S33 and S36: No), first corrector 330 executes the subtraction process on the defective pixel (the pixel) (S38).

In the case where first determiner 320 determines that the target pixel is not a defective pixel (S32: No), first corrector 330 executes the subtraction process on the pixel (normal pixel) (S38).

After the process in Step S35 or S38 ends, first corrector 330 determines whether the determination in Step S32 has been performed for all pixels (S39). In the case where the determination in Step S32 has ended for all pixels 210 (S39: Yes), the process in Step S30 ends. In the case where the determination in Step S32 has not ended for all pixels (S39: No), the process returns to Step S32 and remaining pixels 210 are subjected to the process.

Although FIG. 7 illustrates an example in which first corrector 330 does not execute the subtraction process for each defective pixel determined as underexposed or overexposed by first determiner 320, the present disclosure is not limited to such. First corrector 330 may execute the subtraction process for each defective pixel and, after executing the subtraction process, execute the process in Step S35 for any underexposed or overexposed defective pixel.

Although first determiner 320 determines whether the defective pixel is underexposed and overexposed in FIG. 7, the determination may not necessarily be performed. First corrector 330 may obtain the position information of each defective pixel from storage 360, and execute the process in Step S35 for each defective pixel identified by the obtained position information. Thus, in the case where the defective pixel is identifiable, the pixel value of the defective pixel may be substituted by the average value of the pixel values of pixels 210 neighboring the defective pixel using a median filter or the like. In this case, the process of subtracting the first image data from the second image data may be omitted.

Referring back to FIG. 4, first corrector 330 then outputs the third image data (S40). First corrector 330 may output the third image data to display 700 to display an image corresponding to the third image data on display 700, or output the third image data to storage 360 to store the third image data. In the case where imaging apparatus 10 includes a wireless communication module, first corrector 330 may transmit the third image data via the wireless communication module.

The process illustrated in FIG. 4 may be executed each time imaging by the long exposure is performed, or executed periodically. The obtainment of the first image data in Step S20 may be performed by obtaining the first image data obtained when imaging apparatus 10 performs imaging operation before executing Step S10. In other words, in Step S20, the first imaging operation need not be performed. For example, generator 310 stores the first image data in storage 360. In Step S20, first determiner 320 may obtain first image data by reading, from storage 360, first image data obtained before the current imaging and stored in storage 360. In the case where a plurality of items of first image data are stored in storage 360, first determiner 320 may read first image data stored most recently in storage 360, or read first image data whose first period is close to the second period in current Step S20.

Specifically, in the case where first image data captured under the same exposure condition as the exposure condition in the second imaging operation in Step S10 is stored in storage 360, first determiner 320 may determine to read the first image data. In the case where there is no change between the exposure condition in the previous second imaging operation and the exposure condition in the current second imaging operation, first determiner 320 may determine to read first image data. In the case where there is no change between the exposure condition in the previous second imaging operation and the exposure condition in the current second imaging operation and the elapsed time from the previous second imaging operation is within a predetermined time (for example, 1 min), first determiner 320 may determine to read first image data. The elapsed time from the previous second imaging operation is, for example, the time from when image data is obtained by the previous second imaging operation to when image data is obtained by the current second imaging operation.

In the case where there is no change between the exposure condition in the previous second imaging operation and the exposure condition in the current second imaging operation and the temperature of solid-state imaging device 100 (for example, the temperature of photoelectric conversion element 211) is the same in the previous second imaging operation and the current second imaging operation, first determiner 320 may determine to read first image data. For example, in the case where the difference of the temperature in solid-state imaging device 100 or imaging apparatus 10 between the previous second imaging operation and the current second imaging operation is within a predetermined range (for example, ±1 degree), first determiner 320 may determine to read first image data. In this case, imaging apparatus 10 includes a temperature sensor that measures the temperature of solid-state imaging device 100 or the like. For example, the temperature sensor measures the temperature in imaging apparatus 10. The exposure condition includes at least one of aperture, shutter speed, and ISO sensitivity.

In the case where first determiner 320 determines to read first image data in Step S20, first image data may be obtained by reading first image data from storage 360. In the case where a plurality of items of first image data are stored in storage 360, if at least one item of first image data can be subjected to the read determination, first determiner 320 may perform the read determination.

The process of identifying pixel 210 (defective pixel) having white flaws or black flaws will be described below, with reference to FIGS. 9 to 12. FIG. 9 is a flowchart illustrating operation when obtaining the position information of each defective pixel in imaging apparatus 10 according to this embodiment. The process illustrated in FIG. 9 is executed when camera 1 is shipped or when the user performs pixel refresh.

As illustrated in FIG. 9, first, image data (an example of second image data) is obtained by the second imaging operation (S110). The process in Step S110 is the same as that in Step S10, and its description is omitted. When performing detection operation of detecting a defective pixel, the difference between the second image data and the first image data is not calculated, and accordingly Step S110 may be omitted.

Next, imaging apparatus 10 obtains image data (an example of first image data) by the first imaging operation (S120). The process in Step S120 is the same as that in Step S20, and its description is omitted.

Next, imaging apparatus 10 executes a shading correction process for the first image data (S130). Specifically, second corrector 340 executes the shading correction process using IIR filter 341. Step S130 is an example of a correction step.

Figure 10:
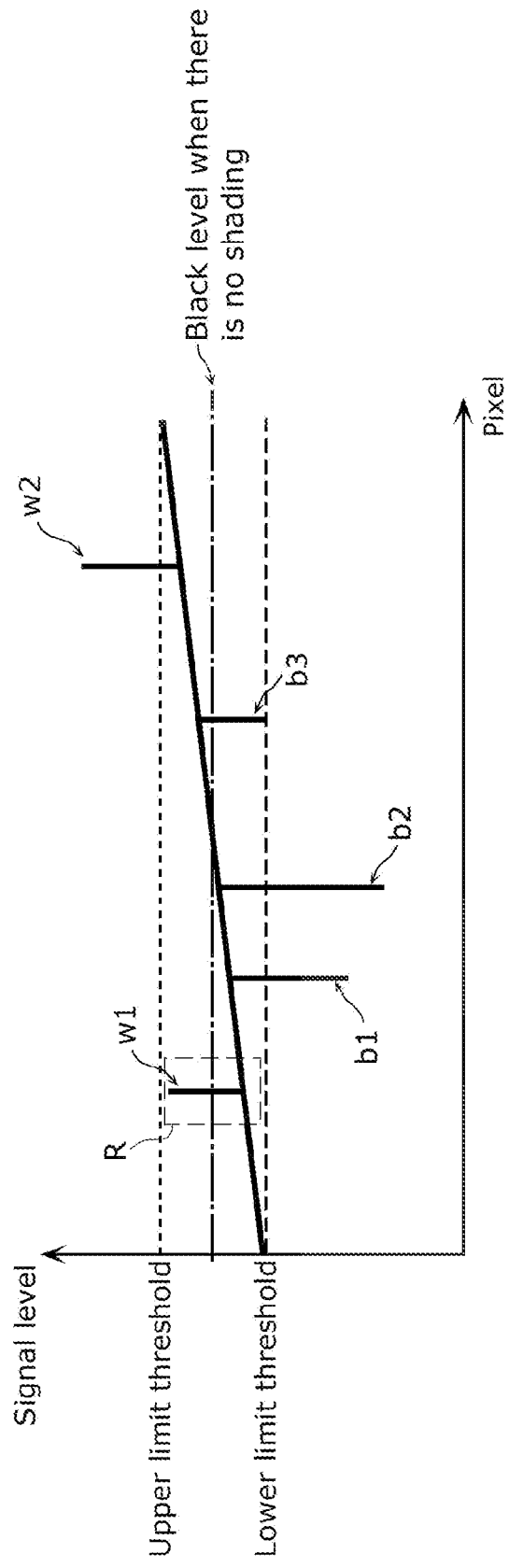
FIG. 10 is a diagram illustrating an example of shading characteristics in the imaging apparatus according to the embodiment.

FIG. 10 is a diagram illustrating an example of shading characteristics in imaging apparatus 10 according to this embodiment. In FIG. 10, the vertical axis represents the signal level, and the horizontal axis represents the pixel position. The upper limit threshold and the lower limit threshold are thresholds for determining whether a pixel is a defective pixel. Specifically, the upper limit threshold is a pixel value for determining whether a white flaw occurs. The lower limit threshold is a pixel value for determining whether a black flaw occurs. The alternate long and short dash line indicates black level when there is no shading (which is a reference signal level, for example, a signal level based on the first offset value). The shading characteristics tend to vary among the plurality of pixels 210. Information of the black level when there is no shading is, for example, stored in storage 360.

In FIG. 10, white flaws w1 and w2 and black flaws b1 to b3 occur. If there is no shading, white flaws w1 and w2 are each greater than or equal to the upper limit threshold, and pixel 210 is determined as a defective pixel. If there is no shading, black flaws b1 to b3 are each less than or equal to the lower limit threshold, and pixel 210 is determined as a defective pixel. Since there is shading, however, the pixel value of pixel 210 having white flaw w1 and the pixel value of pixel 210 having black flaw b3 are each located between the upper limit threshold and the lower limit threshold, as illustrated in FIG. 10. Thus, in the case where there is shading, second determiner 350 cannot determine that pixel 210 having white flaw w1 and pixel 210 having black flaw b3 are defective pixels. In view of this, second corrector 340 executes the shading correction process of correcting the shading characteristics as mentioned above.

Figure 11:
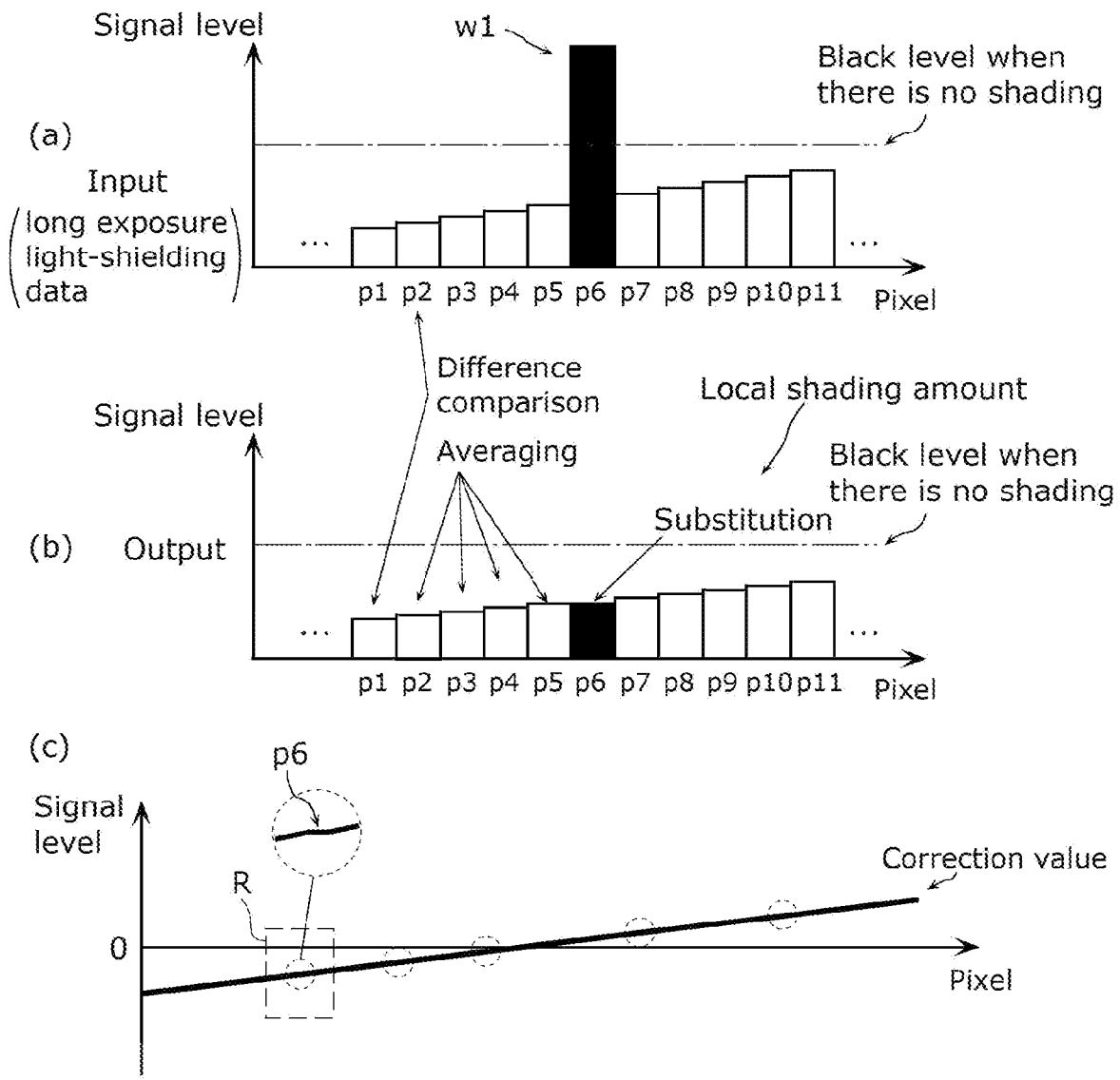
FIG. 11 is a diagram explaining a shading correction process in the imaging apparatus according to the embodiment.

FIG. 11 is a diagram explaining the shading correction process in imaging apparatus 10 according to this embodiment. Specifically, FIG. 11 is a diagram explaining the process of calculating the local shading amount in the shading correction process. (a) in FIG. 11 corresponds to dashed-line region R in FIG. 10, and is an enlarged view of dashed-line region R. In (a) in FIG. 11, pixel 210 having white flaw w1 is indicated as pixel p6, and its neighboring pixels 210 are indicated as pixels p1 to p5 and p7 to p11. (b) in FIG. 11 illustrates the local shading amount in each pixel in dashed-line region R illustrated in (c) in FIG. 11.

(a) in FIG. 11 illustrates image data input to IIR filter 341, for example, first image data (long-exposure light shielding data) output from generator 310. (b) in FIG. 11 illustrates data output from IIR filter 341, indicating the shading amount (local shading amount). The term "local shading amount" denotes, for example, the shading amount for each pixel 210.

As illustrated in (a) in FIG. 11, the signal level (pixel value) varies due to the shading characteristics of each pixel. For example, second corrector 340 executes the local shading amount calculation process from one end to the other in the direction in which pixels p1 to p11 are arranged. In this embodiment, second corrector 340 executes the local shading amount calculation process in the direction from pixel p1 to pixel p11.

As illustrated in (a) and (b) in FIG. 11, second corrector 340 sets the pixel value of the output (hereafter also referred to as "output pixel value") of pixel p1 as the pixel value of the input (hereafter also referred to as "input pixel value") of pixel p1. Second corrector 340 determines the output pixel value of pixel p2 based on the difference between the input pixel value of pixel p2 and the output pixel value of pixel p1. Specifically, in the case where the difference is less than or equal to a predetermined threshold (an example of a third threshold), for example, in the case where the absolute value of the difference is less than or equal to the predetermined threshold, second corrector 340 determines that pixel p2 has no white flaw or black flaw. This means that pixel p2 is a normal pixel. Second corrector 340 then sets the output pixel value of pixel p2 to an average value (an example of a second average value) based on the input pixel value of pixel p2 and the output pixel value of pixel p1 (an example of a first average value). Second corrector 340 may calculate the average value by equivalent average or weighted average.

Next, second corrector 340 determines the output pixel value of pixel p3 based on the difference between the input pixel value of pixel p3 and the output pixel value of pixel p2. Specifically, in the case where the difference is less than or equal to the predetermined threshold (an example of a third threshold), second corrector 340 determines that pixel p3 has no white flaw or black flaw. This means that pixel p3 is a normal pixel. Second corrector 340 then sets the output pixel value of pixel p3 to an average value (an example of a second average value) based on the input pixel value of pixel p3 and the output pixel value of pixel p2 (an example of a first average value). Thus, second corrector 340 performs a process of averaging the pixel value of pixel 210 having no white flaw or black flaw.

Second corrector 340 sequentially executes the local shading amount calculation process in this way.

The local shading amount calculation process for a defective pixel having a white flaw or a black flaw will be described below. Second corrector 340 determines the output pixel value of pixel p6 based on the difference between the input pixel value of pixel p6 and the output pixel value of pixel p5. Specifically, in the case where the difference is greater than the predetermined threshold (an example of a third threshold), for example, in the case where the absolute value of the difference is greater than the predetermined threshold, second corrector 340 determines that pixel p6 has a white flaw or a black flaw. This means that pixel p6 is a defective pixel. Second corrector 340 then sets the output pixel value of pixel p6 to the output pixel value of pixel p5 (an example of a first average value).

Therefore, even when a pixel has a white flaw or a black flaw, the output pixel value of the pixel can be set to an average value (local shading amount) eliminating the influence of the white flaw or the black flaw. Second corrector 340 thus performs a process of substituting the pixel value of pixel 210 having a white flaw or a black flaw by the average pixel value of one or more pixels 210 located in one direction (leftward in the example in FIG. 11) with respect to pixel 210.

Second corrector 340 executes this process for each of the plurality of pixels 210. For example, second corrector 340 executes the process using IIR filter 341. This makes it possible to calculate the local shading amount in each of the plurality of pixels 210 while suppressing the influence of white flaws or black flaws. That is, IIR filter 341 can remove, from first image data having components of white flaws and black flaws, the components of white flaws and black flaws, so that a more accurate local shading amount can be calculated.

After executing the foregoing process for each of the plurality of pixels 210, second corrector 340 subtracts, for each of the plurality of pixels 210, a correction value based on the local shading amount from the first image data as input. For example, second corrector 340 subtracts the correction value of each of the plurality of pixels 210 illustrated in (c) in FIG. 11 from the first image data. Second corrector 340 calculates the correction value illustrated in (c) in FIG. 11, based on the black level (signal level) when there is no shading and the local shading amount illustrated in (b) in FIG. 11. For example, second corrector 340 calculates the difference between the black level (signal level) when there is no shading and the local shading amount illustrated in (b) in FIG. 11 in each of the plurality of pixels 210, as the correction value.

(c) in FIG. 11 illustrates the correction value of pixel 210 corresponding to pixel 210 illustrated in FIG. 10. The correction value in dashed-line region R in (c) in FIG. 11 indicates the correction value based on the local shading amount in each of pixels p1 to p11 illustrated in (b) in FIG. 11. The five dashed-line circles in (c) in FIG. 11 indicate the correction values corresponding to the defective pixel having a black flaw or a white flaw and the pixels neighboring the defective pixel illustrated in FIG. 10. Specifically, the dashed-line circles indicate the correction values including the defective pixels having white flaw w1, black flaw b1, black flaw b2, black flaw b3, and white flaw w2 in order from the left in the drawing.

The correction value of a defective pixel having a white flaw or a black flaw is equal to the correction value of a pixel adjacent to the defective pixel. Take the defective pixel having white flaw w1 as an example. The correction value of pixel p6 having white flaw w1 included in dashed-line region R is equal to the correction value of pixel 210 (left-adjacent pixel 210 in (c) in FIG. 11) adjacent to pixel p6. The same applies to the correction values of the defective pixels having black flaw b1, black flaw b2, black flaw b3, and white flaw w2 (the correction values in the other dashed-line circles in (c) in FIG. 11).

Thus, second corrector 340 can generate the first image data from which the influence of shading characteristics has been removed. Second corrector 340 outputs the first image data that has undergone the shading correction process, to second determiner 350. The correction value based on the local shading amount may be calculated by performing a predetermined operation other than the above on the local shading amount, or may be the local shading amount itself.

Figure 12:
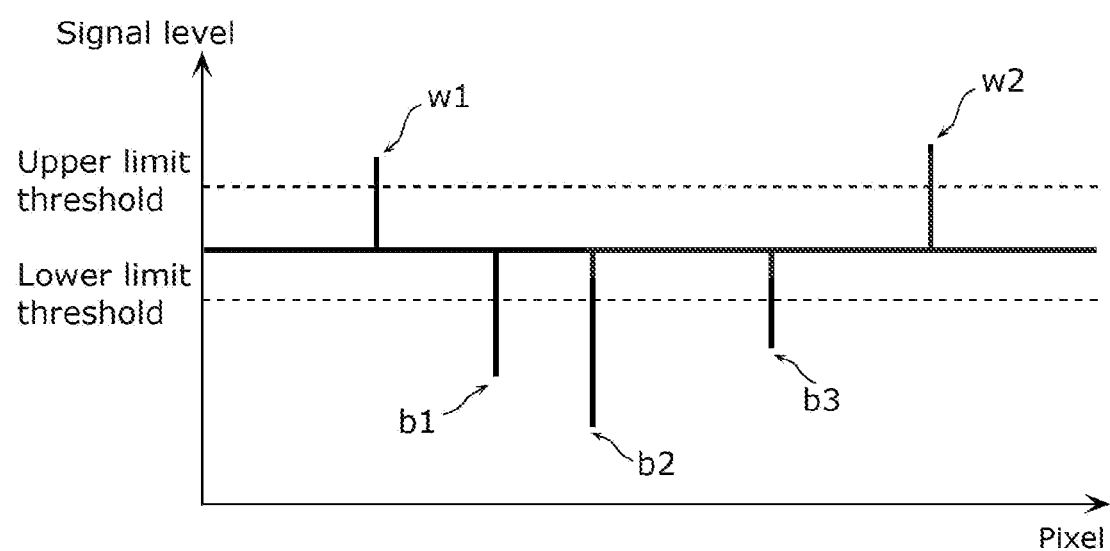
FIG. 12 is a diagram illustrating first image data after the shading correction process in the imaging apparatus according to the embodiment.

FIG. 12 is a diagram illustrating first image data that has undergone the shading correction process in imaging apparatus 10 according to this embodiment. Specifically, FIG. 12 illustrates first image data obtained as a result of performing the shading correction process on the first image data illustrated in FIG. 10.

Referring back to FIG. 9, second determiner 350 determines, for each of the plurality of pixels 210, whether the pixel value in the first image data as a result of the shading correction process is outside a predetermined range (S140). In other words, second determiner 350 determines, for each of the plurality of pixels 210, whether a white flaw or a black flaw occurs, based on the first image data.

Here, second determiner 350 can perform the determination more accurately by using the first image data from which the influence of shading has been removed, as illustrated in FIG. 12. For example, second determiner 350 can perform the determination using thresholds defined by certain values such as an upper limit threshold and a lower limit threshold. Step S140 is an example of a determination step.

In the case where second determiner 350 determines that the pixel value is outside the predetermined range (S140: Yes), second determiner 350 stores position information of pixel 210 in storage 360 (S150). The position information is information indicating the position of pixel 210. Step S150 is an example of a storage step.

In the case where second determiner 350 determines that the pixel value is not outside the predetermined range (S140: No), the process advances to Step S160. That is, in the case where the pixel value is not outside the predetermined range, second determiner 350 does not store the position information of pixel 210 in storage 360.

Next, second determiner 350 determines whether the foregoing determination has been performed for all of the plurality of pixels 210 (S160). In the case where the determination in Step S140 has been performed for all pixels 210 (S160: Yes), second determiner 350 ends the process. In the case where the determination in Step S140 has not been performed for all pixels 210 (S160: No), the process returns to Step S140 and the process is performed for remaining pixels 210.

5. Application Examples

Figure 13:
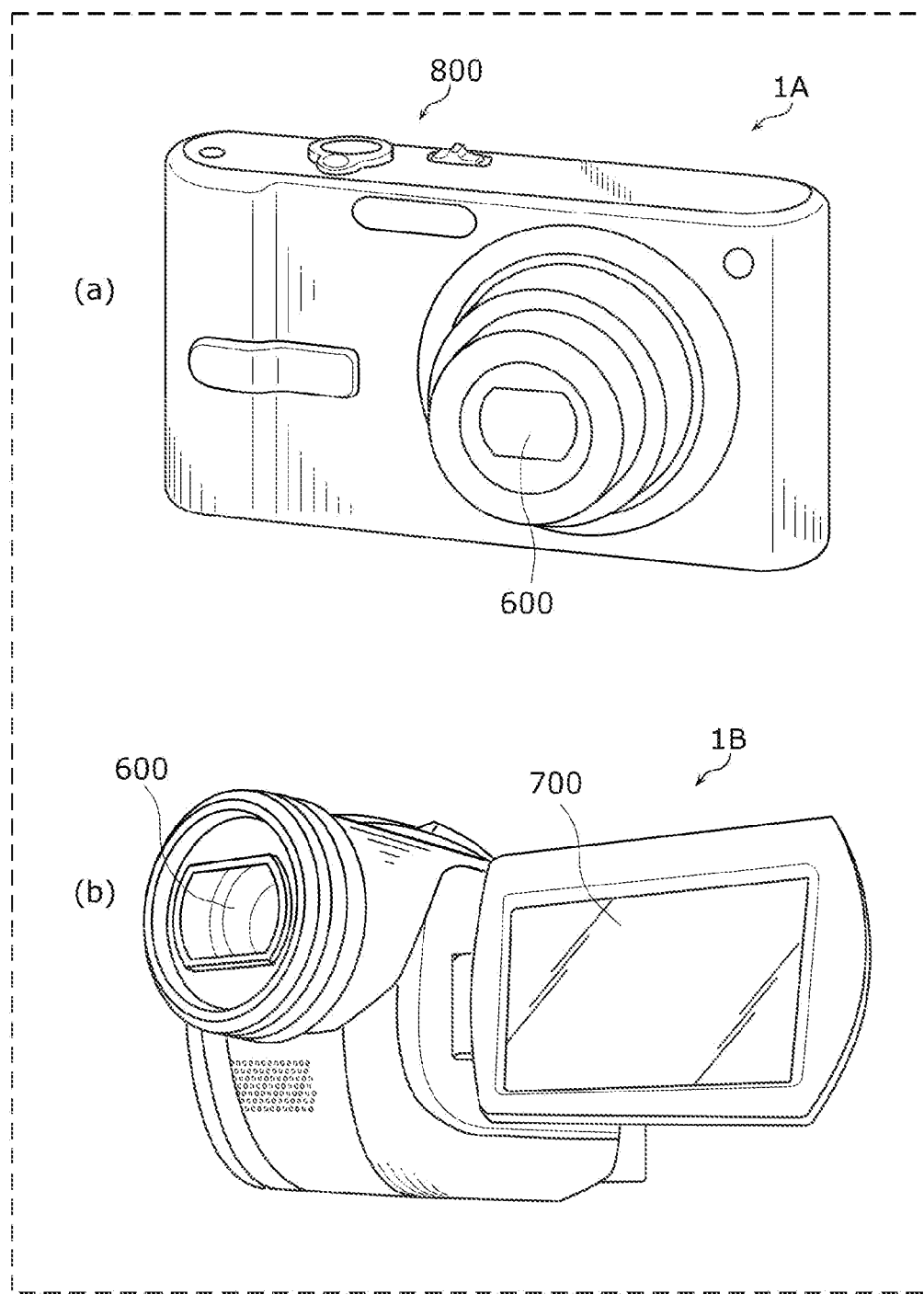
FIG. 13 is an external view of the camera including the imaging apparatus according to the embodiment.

Examples of camera 1 including imaging apparatus 10 described above include digital still camera 1A illustrated in (a) in FIG. 13 and digital video camera 1B illustrated in (b) in FIG. 13. For example, as a result of imaging apparatus 10 according to this embodiment being included in the camera illustrated in (a) or (b) in FIG. 13, even in the case where black flaws and white flaws occur, both of the black flaws and the white flaws can be appropriately detected and also appropriately removed, as described above.

Camera 1 may be included in a mobile terminal such as a smartphone or a tablet terminal, a game machine, or the like.

6. Effects, Etc.

As described above, the image generation method according to this embodiment is an image generation method in imaging apparatus 10 that includes a plurality of pixels 210, the image generation method including: a first imaging step of performing a first imaging operation of capturing an image when each of the plurality of pixels 210 is shielded from light, in a state in which a reference signal level in the first imaging operation is set to a first offset value (S22); and a first generation step of generating first image data based on a pixel signal (an example of a first pixel signal) obtained by the first imaging operation (S24). The first offset value is higher than a second offset value that is a reference signal level in a second imaging operation of capturing an image in a state in which light is incident on each of the plurality of pixels 210.

Thus, in the case where a black flaw occurs, underexposure due to the black flaw can be suppressed as compared with the case where the offset value in the first imaging operation is the second offset value, so that the black flaw can be accurately detected. Therefore, with the image generation method according to this embodiment, noise can be obtained more appropriately than conventional techniques. That is, with the image generation method according to this embodiment, noise can be obtained more accurately than conventional techniques.

For example, in the case where the imaging apparatus corrects noise (white flaws and black flaws) using the first image data obtained by the foregoing method, more accurate correction than conventional techniques is possible. In particular, more accurate correction than conventional techniques can be made for black flaws.

The image generation method further includes: a second imaging step of performing the second imaging operation (S10); a second generation step of generating second image data based on a pixel signal (an example of a second pixel signal) obtained by the second imaging operation (S10); and a third generation step of generating third image data by subtracting the first image data from the second image data (S30).

Thus, the third image data is image data from which noise has been removed than conventional. That is, image data from which noise, in particular black flaws, has been removed than conventional techniques can be obtained.

The image generation method further includes: a determination step of determining, for each of the plurality of pixels 210, whether a pixel value of pixel 210 in the first image data is outside a predetermined range, based on the first image data (S140); and a storage step of storing position information indicating a position of a defective pixel whose pixel value is determined to be outside the predetermined range in the determination step (S150).

Thus, in the determination step, the defective pixel can be determined more accurately. For example, a defective pixel having a black flaw can be detected more accurately than conventional techniques.

The image generation method further includes: a correction step of correcting, according to shading characteristics of each of the plurality of pixels 210, the pixel value of the pixel in the first image data generated in the first generation step (S130). In the determination step, the determination is performed on the first image data corrected in the correction step.

Thus, whether the pixel is a defective pixel can be determined without being influenced by the shading characteristics. This further improves the determination accuracy in the determination step.

In the correction step, the shading characteristics of each of the plurality of pixels 210 are obtained by: when a difference between the pixel value of pixel 210 and a first average value of respective one or more pixel values of one or more pixels 210 located in one direction with respect to pixel 210 is less than or equal to a third threshold, setting the pixel value of pixel 210 to a second average value that is an average value of the pixel value of pixel 210 and the first average value; and when the difference is greater than the third threshold, setting the pixel value of pixel 210 to the first average value.

Thus, the shading characteristics (for example, local shading amount) can be obtained without being influenced by white flaws and black flaws. Therefore, even in the case where white flaws and black flaws occur, correction according to the shading characteristics can be performed more accurately.

In the third generation step, position information of a defective pixel whose noise component increases with exposure time is obtained, and the subtracting in the defective pixel is not performed when a pixel value of the defective pixel in the second image data based on the position information obtained is less than or equal to a first threshold that is a signal level lower than the second offset value.

Thus, the subtraction process is not performed for an underexposed defective pixel, i.e. a defective pixel having an undetected noise component in a black flaw. By not performing the subtraction process for a defective pixel whose black flaw cannot be corrected appropriately, inappropriate correction (for example, excessive subtraction) can be prevented.

In the third generation step, position information of a defective pixel whose noise component increases with exposure time is obtained, and the subtracting in the defective pixel is not performed when a pixel value of the defective pixel in the second image data based on the position information obtained is greater than or equal to a second threshold that is a signal level higher than the second offset value.

Thus, the subtraction process is not performed for an overexposed defective pixel, i.e. a defective pixel having an undetected noise component in a white flaw. By not performing the subtraction process for a defective pixel whose white flaw cannot be corrected appropriately, inappropriate correction (for example, excessive subtraction) can be prevented.

In the third generation step, the pixel value of the defective pixel for which the subtracting is not performed is determined based on a pixel value of at least one pixel 210 neighboring the defective pixel.

Thus, the pixel value of the underexposed or overexposed defective pixel can be complemented based on the pixel value of neighboring pixel 210. Therefore, even in the case where appropriate correction of white flaws or black flaws is not possible, the pixel value of the defective pixel can be determined appropriately.

An exposure time in the second imaging operation and an exposure time in the first imaging operation are equal.

Thus, in each defective pixel, the signal level of white flaws and black flaws contained in the first image data and the signal level of white flaws and black flaws contained in the second image data are equal. Accordingly, white flaws and black flaws can be effectively removed from the second image data.

Imaging apparatus 10 is capable of executing normal exposure in which exposure is performed for a predetermined time and long exposure in which exposure is performed longer than the predetermined time. The second imaging operation is performed using the long exposure, and the second offset value is same as a third offset value that is a reference signal level in the normal exposure.

Thus, in the long exposure in which white flaws and black flaws tend to be noticeable, the white flaws and the black flaws can be appropriately removed.

Imaging apparatus 10 according to this embodiment includes: a plurality of pixels 210; controller 500 that performs control to perform a first imaging operation of capturing an image when each of the plurality of pixels 210 is shielded from light, in a state in which a reference signal level in the first imaging operation is set to a first offset value; and generator 310 that generates image data based on a pixel signal obtained by the first imaging operation. Controller 500 controls the first offset value to be higher than a second offset value that is a reference signal level in a second imaging operation of capturing an image in a state in which light is incident on each of the plurality of pixels 210. A program according to this embodiment is a program for causing a computer to execute the image generation method described above.

This achieves the same effects as the foregoing image generation method.

OTHER EMBODIMENTS

The foregoing embodiment has been described to illustrate the disclosed technology, through the detailed description and the accompanying drawings.

The structural elements in the detailed description and the accompanying drawings may include not only the structural elements essential for the solution of the problem but also the structural elements not essential for the solution of the problem, to illustrate the disclosed technology. The inclusion of such optional structural elements in the detailed description and the accompanying drawings therefore does not mean that these optional structural elements are essential structural elements.

The foregoing embodiment is intended to be illustrative of the disclosed technology, and therefore various changes, replacements, additions, omissions, etc. can be made within the scope of the appended claims and their equivalents.

For example, although the foregoing embodiment describes an example in which the image generation method, etc. are executed in the case where image data contains both white flaws and black flaws, the present disclosure is not limited to such. The image generation method, etc. may be executed in the case where image data contains only black flaws from among white flaws and black flaws. Hence, black flaws can be obtained appropriately.

Although the foregoing embodiment describes an example in which first determiner 320 determines whether a defective pixel is underexposed in Step S32 and whether the defective pixel is overexposed in Step S33, the present disclosure is not limited to such. First determiner 320 may also determine whether a normal pixel is underexposed and whether the normal pixel is overexposed.

Second corrector 340 in the foregoing embodiment may include a low-pass filter, a minimum value filter, or the like, instead of or together with IIR filter 341.

First corrector 330 in the foregoing embodiment may further perform the shading correction process. For example, first corrector 330 may include an IIR filter, and perform the shading correction process on at least one of the first image data and the second image data or on the third image data.

Although the foregoing embodiment describes an example in which second corrector 340 corrects the first image data using the calculated local shading amount, the present disclosure is not limited to such. For example, second corrector 340 may correct the predetermined third threshold and fourth threshold using the calculated local shading amount. Second corrector 340 outputs the third threshold and the fourth threshold corrected according to the shading amount, to second determiner 350. Second determiner 350 may then perform the determination in Step S140 based on the first image data having shading and the third threshold and the fourth threshold corrected according to the shading amount. Thus, second corrector 340 may set the threshold (for example, the third threshold and the fourth threshold) according to the local shading amount, at each pixel position.

The structural elements (functional blocks) in imaging apparatus 10 may be individually formed into one chip or part or all thereof may be included in one chip, using a semiconductor device such as IC (Integrated Circuit) or LSI (Large Scale Integration). The circuit integration technique is not limited to LSIs, and dedicated circuits or general-purpose processors may be used to achieve the same. A field programmable gate array (FPGA) which can be programmed after manufacturing the LSI, or a reconfigurable processor where circuit cell connections and settings within the LSI can be reconfigured, may be used. Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

The whole or part of the foregoing processes may be realized by hardware such as an electronic circuit, or realized by software. A process by software is realized by a processor in imaging apparatus 10 executing a program stored in memory. The program may be recorded in a recording medium and distributed or circulated. For example, by installing the distributed program in another apparatus including a processor and causing the processor to execute the program, the processes can be performed by the apparatus.

The structural elements forming the foregoing processors such as controller 500, generator 310, first determiner 320, first corrector 330, second corrector 340, and second determiner 350 may be a single element that performs centralized control, or may be a plurality of elements that perform distributed control in cooperation with each other. The software program may be provided as an application by communication via a communication network such as the Internet, communication according to a mobile communication standard, or the like.

The division of the functional blocks in each block diagram is an example, and a plurality of functional blocks may be realized as one functional block, one functional block may be divided into a plurality of functional blocks, or part of functions may be transferred to another functional block. Moreover, functions of a plurality of functional blocks having similar functions may be realized by single hardware or software in parallel or in a time-sharing manner.

The order in which the steps are performed in each flowchart is an example provided for specifically describing the presently disclosed techniques, and order other than the above may be used. For example, Steps S10 and S20 in FIG. 4 may be performed in reverse order. Part of the steps may be performed simultaneously (in parallel) with other steps.

Any embodiment obtained by combining the structural elements and functions in the foregoing embodiments is also included in the scope of the present disclosure.

INDUSTRIAL APPLICABILITY

The present disclosure can be widely used for imaging apparatuses that capture images.

REFERENCE SIGNS LIST

1 camera
1A digital still camera
1B digital video camera
10 imaging apparatus
100 solid-state imaging device
110 pixel array portion
120 column AD converter
121 AD converter
130 row scanner
140 column scanner
150 drive controller
160 column signal line
170 scan line
170A reset scan line
170B selection scan line
180 row signal line
210, p1 to p11 pixel
211 photoelectric conversion element
211a upper electrode
211b lower electrode
211c photoelectric conversion film
212 reset transistor
213 amplification transistor
214 selection transistor
215 charge accumulator
300 signal processor
310 generator
320 first determiner
330 first corrector
340 second corrector
341 IIR filter
350 second determiner
360 storage
400 shutter
500 controller
600 lens
700 display
800 operation portion
w1, w2 white flaw
b1 to b3 black flaw
R dashed-line region

The invention claimed is:

1. An image generation method in an imaging apparatus that includes a plurality of pixels, the image generation method comprising:

performing a first imaging operation of capturing an image when each of the plurality of pixels is shielded from light, in a state in which a reset voltage of the plurality of pixels is controlled to be set to a first reset voltage corresponding to a first offset value that is a reference signal level;

generating first image data based on a first pixel signal obtained by the first imaging operation;

performing a second imaging operation of capturing an image in a state in which light is incident on each of the plurality of pixels, in a state in which a reset voltage of the plurality of pixels is controlled to be set to a second reset voltage corresponding to a second offset value that is a reference signal level;

generating second image data based on a second image signal obtained in the second imaging operation; and generating third image data by subtracting the first image data from the second image data, wherein the first offset value is higher than the second offset value.

2. The image generation method according to claim 1, further comprising:

determining, for each of the plurality of pixels, whether a pixel value of the pixel in the first image data is outside a predetermined range, based on the first image data; and storing position information indicating a position of a defective pixel whose pixel value is determined to be outside the predetermined range in the determining.

3. The image generation method according to claim 2, further comprising:

correcting, according to shading characteristics of each of the plurality of pixels, the pixel value of the pixel in the first image data generated, wherein the determining is performed on the first image data corrected in the correcting.

4. The image generation method according to claim 3, wherein in the correcting, the shading characteristics of each of the plurality of pixels are obtained by: when a difference between the pixel value of the pixel and a first average value of respective one or more pixel values of one or more pixels located in one direction with respect to the pixel is less than or equal to a third threshold, setting the pixel value of the pixel to a second average value that is an average value of the pixel value of the pixel and the first average value; and when the difference is greater than the third threshold, setting the pixel value of the pixel to the first average value.

5. The image generation method according to claim 1, wherein in the generating of the third image data, position information of a defective pixel whose noise component increases with exposure time is obtained, and the subtracting in the defective pixel is not performed when a pixel value of the defective pixel in the second image data based on the position information obtained is less than or equal to a first threshold that is a signal level lower than the second offset value.

6. The image generation method according to claim 1, wherein in the generating of the third image data, position information of a defective pixel whose noise component increases with exposure time is obtained, and the subtracting in the defective pixel is not performed when a pixel value of the defective pixel in the second image data based on the position information obtained is greater than or equal to a second threshold that is a signal level higher than the second offset value.

7. The image generation method according to claim 5, wherein in the generating of the third image data, the pixel value of the defective pixel for which the subtracting is not performed is determined based on a pixel value of at least one pixel neighboring the defective pixel.

8. The image generation method according to claim 1, wherein an exposure time in the second imaging operation and an exposure time in the first imaging operation are equal.

9. The image generation method according to claim 1, wherein the imaging apparatus is capable of executing normal exposure in which exposure is performed for a predetermined time and long exposure in which exposure is performed longer than the predetermined time, the second imaging operation is performed using the long exposure, and the second offset value is same as a third offset value that is a reference signal level in the normal exposure.

10. An imaging apparatus, comprising:

a plurality of pixels;

a controller that performs control to perform a first imaging operation of capturing an image when each of the plurality of pixels is shielded from light, in a state in which a reset voltage of the plurality of pixels is controlled to be set to a first reset voltage corresponding to a first offset value which is a reference signal level; and a generator that generates first image data based on a pixel signal obtained by the first imaging operation;

wherein the controller performs control to perform a second imaging operation of capturing an image in a state in which light is incident on each of the plurality of pixels, in a state in which a reset voltage of the plurality of pixels is controlled to be a second offset value that is a reference signal level, the generator generates second image data based on a second image signal obtained in the second imaging operation;

the imaging apparatus further comprises: a corrector that generates third image data by subtracting the first image data from the second image data; and the controller controls the first offset value to be set to a value higher than the second offset value.

11. A non-transitory computer-readable recording medium having a program recorded thereon for causing a computer to execute the image generation method according to claim 1.

* * * * *